US009024881B2

(12) United States Patent
Nomura et al.

(10) Patent No.: US 9,024,881 B2
(45) Date of Patent: May 5, 2015

(54) INFORMATION PROCESSING APPARATUS, INFORMATION PROCESSING METHOD, AND COMPUTER PROGRAM

(75) Inventors: Eisuke Nomura, Tokyo (JP); Fuminori Homma, Tokyo (JP); Yusuke Miyazawa, Tokyo (JP); Ikuo Yamano, Tokyo (JP)

(73) Assignee: Sony Corporation, Tokyo (JP)

( * ) Notice: Subject to any disclaimer, the term of this patent is extended or adjusted under 35 U.S.C. 154(b) by 81 days.

(21) Appl. No.: 13/267,412

(22) Filed: Oct. 6, 2011

(65) Prior Publication Data
US 2012/0092261 A1   Apr. 19, 2012

(30) Foreign Application Priority Data

Oct. 15, 2010 (JP) ................. P2010-232170

(51) Int. Cl.
*G06F 3/02* (2006.01)
*G06F 3/0488* (2013.01)

(52) U.S. Cl.
CPC .................. *G06F 3/04886* (2013.01)

(58) Field of Classification Search
CPC ............ G06F 3/04886; G06F 3/04883; G06F 3/0236; G06F 3/0237; G06F 3/0481
USPC .................. 345/168–184; 715/773
See application file for complete search history.

(56) References Cited

U.S. PATENT DOCUMENTS

| 5,627,567 | A  | * | 5/1997  | Davidson ........................ 345/173 |
| 6,169,538 | B1 | * | 1/2001  | Nowlan et al. ................. 345/168 |
| 6,504,530 | B1 | * | 1/2003  | Wilson et al. .................. 345/173 |
| 7,385,592 | B2 | * | 6/2008  | Collins ......................... 345/173 |
| 8,232,973 | B2 | * | 7/2012  | Kocienda et al. ............. 345/173 |
| 8,281,251 | B2 | * | 10/2012 | Jo ................................ 715/771 |
| 8,296,680 | B2 | * | 10/2012 | Griffin et al. ................ 715/841 |
| 8,345,008 | B2 | * | 1/2013  | Lee et al. ...................... 345/168 |
| 8,381,118 | B2 | * | 2/2013  | Minton ......................... 715/773 |
| 8,381,119 | B2 | * | 2/2013  | Yeh et al. ..................... 715/773 |
| 2004/0135818 | A1 | * | 7/2004  | Thomson et al. ............. 345/823 |
| 2005/0162398 | A1 | * | 7/2005  | Eliasson et al. ............. 345/173 |
| 2006/0053387 | A1 | * | 3/2006  | Ording ......................... 715/773 |
| 2006/0161846 | A1 | * | 7/2006  | Van Leeuwen ............... 715/702 |
| 2006/0279548 | A1 | * | 12/2006 | Geaghan ...................... 345/173 |
| 2008/0024451 | A1 | * | 1/2008  | Aimi et al. .................... 345/168 |
| 2009/0058829 | A1 | * | 3/2009  | Kim et al. .................... 345/173 |
| 2009/0150785 | A1 | * | 6/2009  | Asami et al. ................. 715/727 |
| 2009/0174667 | A1 | * | 7/2009  | Kocienda et al. ............ 345/169 |
| 2009/0201266 | A1 | * | 8/2009  | Hashimoto et al. .......... 345/173 |
| 2009/0231282 | A1 | * | 9/2009  | Fyke ............................ 345/169 |
| 2009/0319935 | A1 | * | 12/2009 | Figura .......................... 715/773 |
| 2010/0066695 | A1 | * | 3/2010  | Miyazaki ..................... 345/173 |

(Continued)

FOREIGN PATENT DOCUMENTS

| JP | 10-049305   | 2/1998  |
| JP | 2003-296027 | 10/2003 |

*Primary Examiner* — Amare Mengistu
*Assistant Examiner* — Crystal A Mathews
(74) *Attorney, Agent, or Firm* — Oblon, McClelland, Maier & Neustadt, L.L.P.

(57) ABSTRACT

An information processing apparatus including a display controller that controls a display to display a keyboard, an interface that receives position information corresponding to a user input detected at a user interface, and a processor that determines that the received position information corresponds to a first determination region of a first key of the displayed keyboard and expands a second determination region of a second key based on the determining.

20 Claims, 19 Drawing Sheets

INPUT TARGET KEY
<HORIZONTAL ENLARGEMENT>

(56) References Cited

U.S. PATENT DOCUMENTS

| | | | |
|---|---|---|---|
| 2010/0117970 A1* | 5/2010 | Burstrom et al. | 345/173 |
| 2010/0169819 A1* | 7/2010 | Bestle et al. | 715/773 |
| 2010/0289752 A1* | 11/2010 | Birkler | 345/173 |
| 2010/0313120 A1* | 12/2010 | Ho et al. | 715/261 |
| 2010/0333011 A1* | 12/2010 | Kornev et al. | 715/773 |
| 2011/0041056 A1* | 2/2011 | Griffin et al. | 715/708 |
| 2011/0074704 A1* | 3/2011 | Causey et al. | 345/173 |
| 2011/0078567 A1* | 3/2011 | Kim et al. | 715/702 |
| 2011/0078613 A1* | 3/2011 | Bangalore | 715/773 |
| 2011/0128230 A1* | 6/2011 | Griffin | 345/169 |
| 2011/0179355 A1* | 7/2011 | Karlsson | 715/702 |
| 2011/0264442 A1* | 10/2011 | Huang et al. | 704/9 |
| 2011/0267278 A1* | 11/2011 | Wickstrom | 345/173 |
| 2011/0302519 A1* | 12/2011 | Fleizach et al. | 715/773 |
| 2012/0062465 A1* | 3/2012 | Spetalnick | 345/168 |

* cited by examiner

FIG. 3
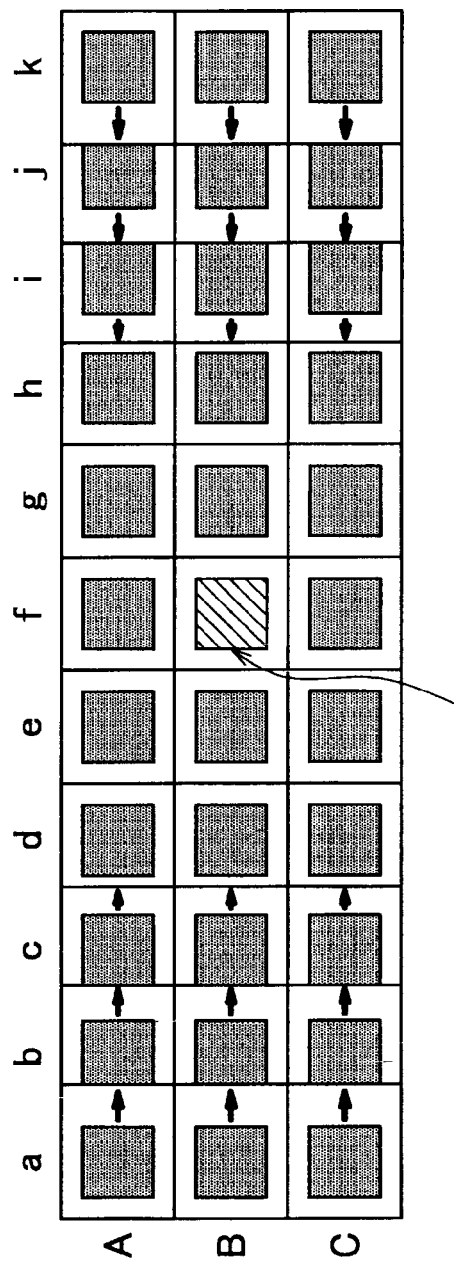
INPUT TARGET KEY
<HORIZONTAL ENLARGEMENT>
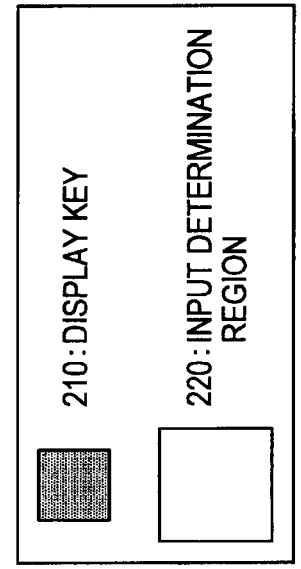
210: DISPLAY KEY
220: INPUT DETERMINATION REGION <VERTICAL ENLARGEMENT>

FIG. 5

| STATE | STATE 0 : NON-CONTACT | STATE 1 : CONTACT | STATE 2 : PRESS-DOWN |
|---|---|---|---|
| PROXIMITY SENSOR | FINGER IS OUTSIDE PROXIMITY DETECTION REGION | FINGER IS WITHIN PROXIMITY DETECTION REGION | FINGER IS WITHIN PROXIMITY DETECTION REGION AND CONTACT IS DETECTED BY TOUCH PANEL |
| PRESSURE SENSOR | $F \leq 0$ | $0 < F \leq F_{input}$ | $F_{input} < F$ |

FIG. 10
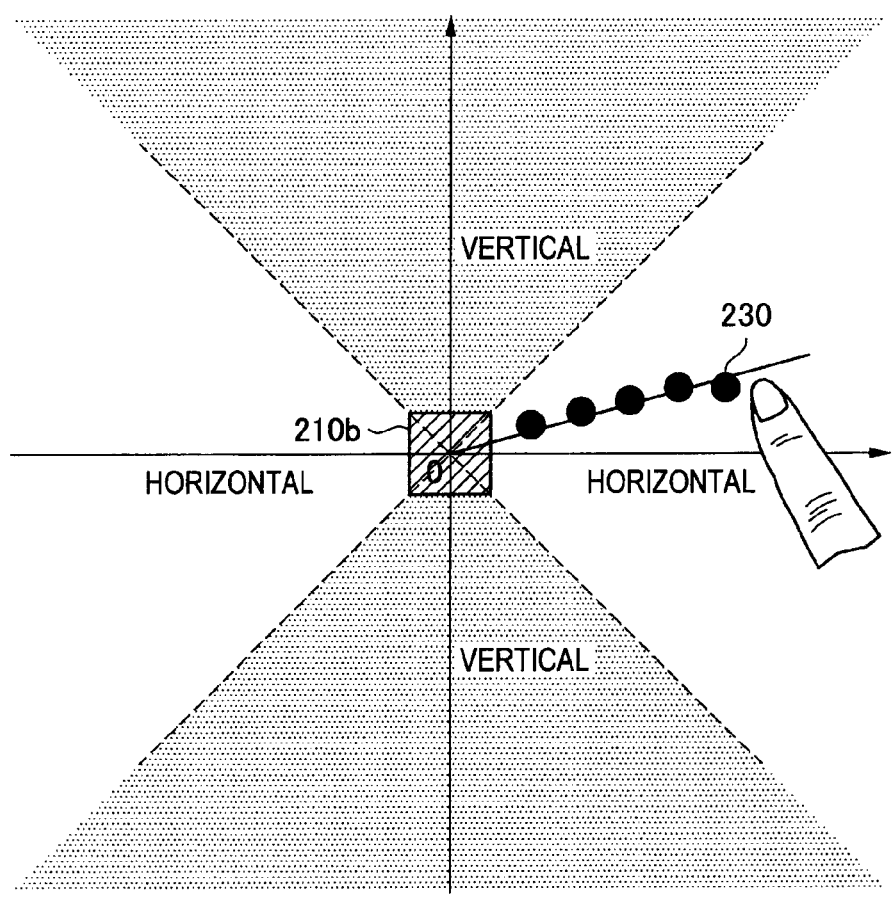
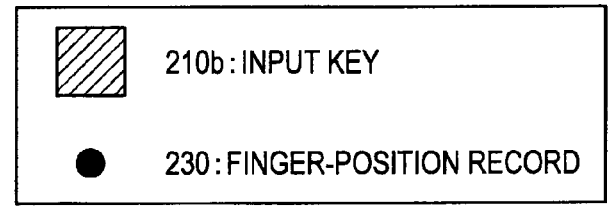

FIG. 12
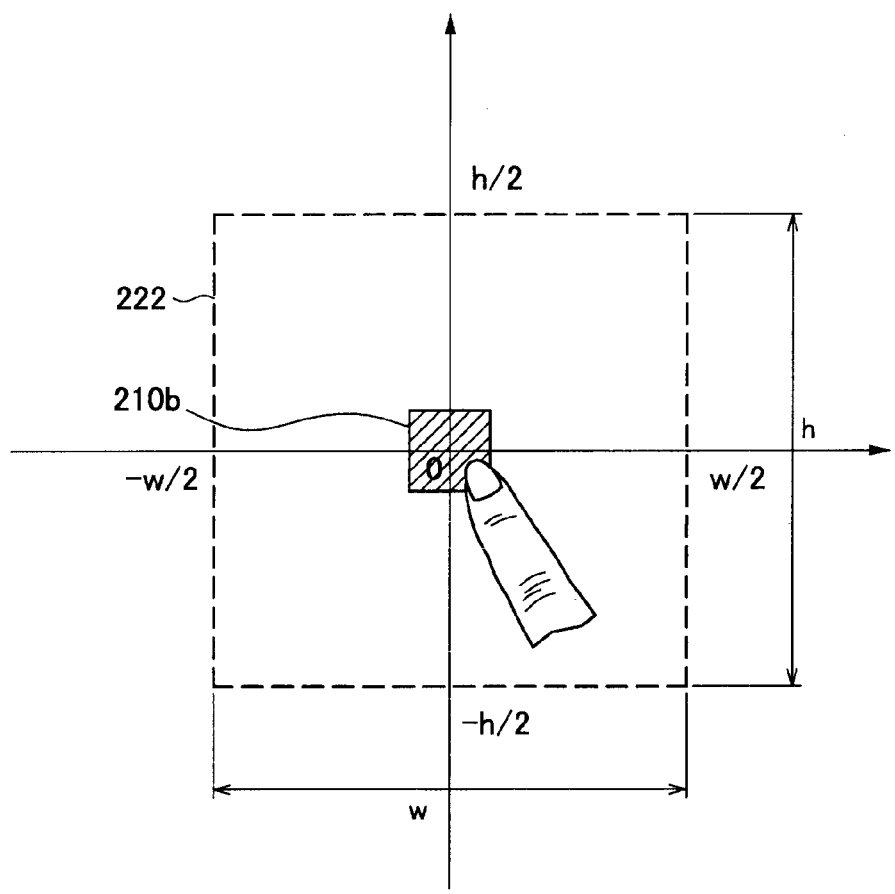
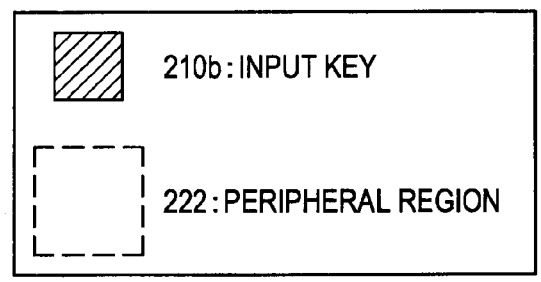

FIG. 18

| PREVIOUS STATE | CURRENT STATE | | | |
|---|---|---|---|---|
| LAYOUT | NON-CONTACT | CONTACT | SEMI-PRESS-DOWN | PRESS-DOWN |
| NON-CONTACT | NO CHANGE | NO CHANGE | NO CHANGE | ENLARGE DETERMINATION REGIONS OF PERIPHERAL KEYS |
| CONTACT | DEFAULT | NO CHANGE | NO CHANGE | ENLARGE DETERMINATION REGIONS OF PERIPHERAL KEYS |
| SEMI-PRESS-DOWN | DEFAULT | ENLARGE DETERMINATION REGIONS OF DISTANT KEYS | NO CHANGE | ENLARGE DETERMINATION REGIONS OF PERIPHERAL KEYS |
| PRESS-DOWN | DEFAULT | ENLARGE DETERMINATION REGIONS OF DISTANT KEYS | NO CHANGE | NO CHANGE |

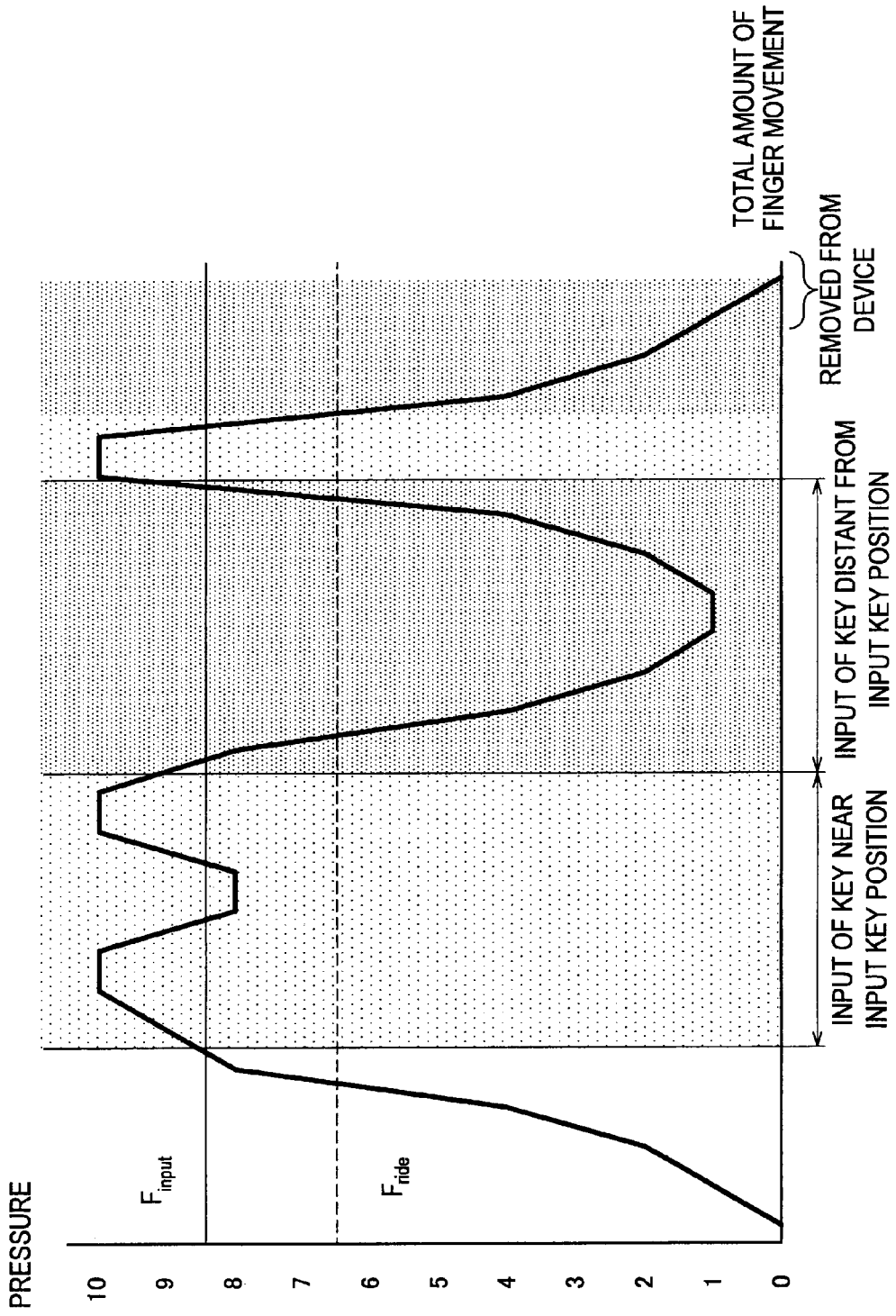

INFORMATION PROCESSING APPARATUS, INFORMATION PROCESSING METHOD, AND COMPUTER PROGRAM

CROSS REFERENCE TO RELATED APPLICATIONS

This application claims the benefit of priority under 35 U.S.C. §119 to Japanese Patent Application JP 2010-232170 filed in the Japan Patent Office on Oct. 15, 2010, the entire content of which is hereby incorporated by reference.

BACKGROUND

The present disclosure relates to information processing apparatus, an information processing method, and a computer program.

In recent years, with the increase in devices having a touch panel, development of devices capable of measuring pressure is being made. Operation by press-down is performed in a state where a finger is pressed down into a device. Thus, in the case of a press-down input operation, contact coordinates do not greatly deviate even if the same key is successively input. However, in the case of performing an operation where the finger has to be moved, such as when successively performing another key input in a state where press-down is being performed, a physical load is caused due to friction between the finger and the device. A user may feel fatigue in the finger or the like operating the keys due to this physical load, and the operability may be reduced.

On the other hand, with a key input for a touch panel operation, to determine a key that is the input target, a determination region for key input is set for each key. To improve the operability of key input, the determination region of key input is dynamically changed. For example, JP H10-49305A (hereinafter, patent document 1) discloses a touch panel input device for preventing, in the case a plurality of keys are input by one key input on the touch panel, incorrect input by enlarging keys displayed on the screen. Also, JP 2003-296027A (hereinafter, patent document 2) discloses a button recognition region optimization method for a touch panel for improving operability and recognition rate of a touch panel by automatically optimizing a recognition region according to the arrangement of buttons on a screen or the state of adjacency between the buttons.

SUMMARY

However, according to patent document 1 described above, input had to be performed twice for one key input, before and after the enlargement of the key, and there was an issue that the operational load was great. Also, according to patent document 2 described above, there was an issue that, since optimization correction of a button recognition region was performed regardless of the state of input by a user, input was detected in a state where the user did not intend to input a key. Furthermore, according to patent documents 1 and 2, successive key inputs to a device enabling a press-down operation were not assumed, and, thus, there was an issue that the physical load on the finger was still great with successive key inputs to such a device and that the operability was reduced.

In light of the foregoing, it is desirable to provide an information processing apparatus, an information processing method, and a computer program which are novel and improved, and which are capable of reducing a physical load caused due to successive key input operations by press-down.

According to a first exemplary embodiment, the disclosure is directed to an information processing apparatus including a display controller that controls a display to display a keyboard, an interface that receives position information corresponding to a user input detected at a user interface, and a processor that determines that the received position information corresponds to a first determination region of a first key of the displayed keyboard and expands a second determination region of a second key based on the determining.

According to another embodiment, the disclosure is directed to a method performed by an information processing apparatus. The method includes controlling, by a display controller, a display to display a keyboard, receiving, at an interface of the information processing apparatus, position information corresponding to a user input detected at a user interface, determining, by a processor of the information processing apparatus, that the received position information corresponds to a first determination region of a first key of the displayed keyboard, and expanding a second determination region of a second key based on the determining.

According to another embodiment, the disclosure is directed to a non-transitory computer-readable medium including computer program instructions, which when executed by an information processing apparatus, cause the information processing apparatus to perform a method. The method including controlling a display to display a keyboard, receiving position information corresponding to a user input detected at a user interface, determining that the received position information corresponds to a first determination region of a first key of the displayed keyboard, and expanding a second determination region of a second key based on the determining.

BRIEF DESCRIPTION OF THE DRAWINGS

FIG. 3 is an explanatory diagram showing an overview of an enlargement process, in the horizontal direction, of determination regions of keys positioned away from the input target key;

FIG. 5 is an explanatory diagram showing definitions of state relationships between a touch panel and a finger according to the type of a proximity/pressure detection device;

FIG. 10 is an explanatory diagram showing an input direction detection process according to the embodiment;

FIG. 12 is an explanatory diagram showing a definition of a peripheral region in the case of specifying the peripheral region by a rectangle;

FIG. 18 is a list of processes summarizing the determination region selection process shown in FIG. 17; and FIG. 19 is a graph showing an example of determination region change where the horizontal axis shows the total amount of movement of a finger and the vertical axis shows the magnitude of a detected pressure.

DETAILED DESCRIPTION OF THE EMBODIMENT(S)

Figure 1:
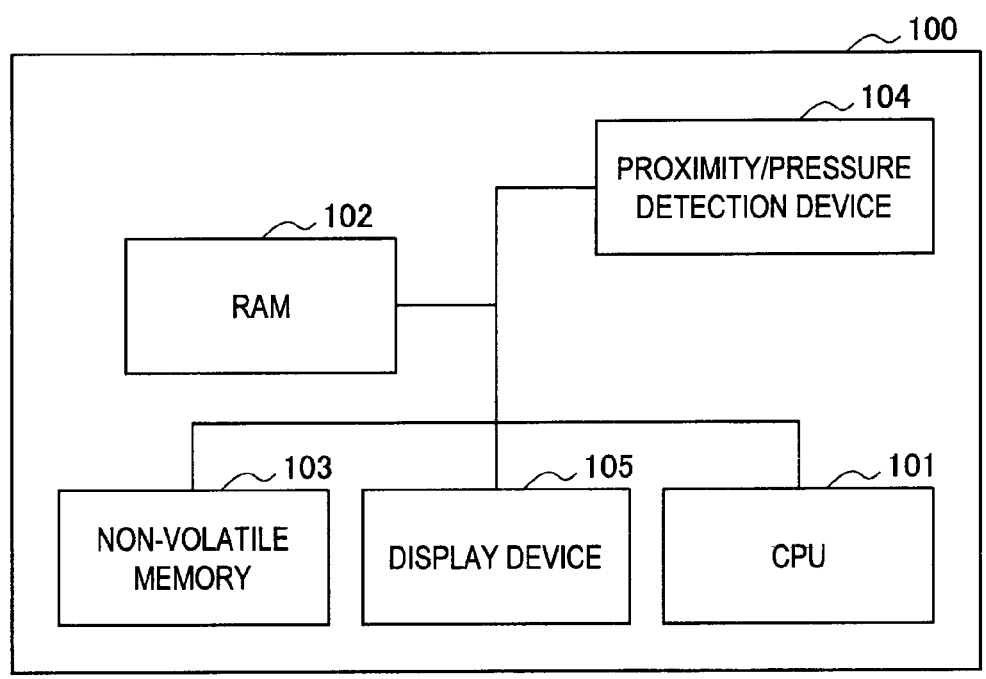
FIG. 1 is a block diagram showing an example hardware configuration of an information processing apparatus according to a first embodiment of the present disclosure.

Hereinafter, preferred embodiments of the present disclosure will be described in detail with reference to the appended drawings. Note that, in this specification and the appended drawings, structural elements that have substantially the same function and configuration are denoted with the same reference numerals, and repeated explanation of these structural elements is omitted.

Additionally, an explanation will be given in the following order.
1. First Embodiment
  Example Hardware Configuration of Information Processing Apparatus
  Overview of Determination Region Enlargement Process for Key by Information Processing Apparatus
  Functional Configuration of Information Processing Apparatus
  Determination Region Change Process by Information Processing Apparatus
    1-1-1. Processes of Key Input and State Determination: Proximity Sensor
    1-1-2. Processes of Key Input and State Determination: Pressure Sensor
    1-2. Input Direction Detection Process
    1-3. Determination Region Change Process
2. Second Embodiment
  Determination Region Change Process by Information Processing Apparatus
    2-1. Processes of Key Input and State Determination
    2-2. Input Direction Detection Process
    2-3. Determination Region Change Process
  Example of Determination Region Change <1. First Embodiment>

[Example Hardware Configuration of Information Processing Apparatus]

First, an example hardware configuration of an information processing apparatus according to a first embodiment of the present disclosure will be described with reference to FIG. 1. Additionally, FIG. 1 is a block diagram showing an example hardware configuration of an information processing apparatus 100 according to the present embodiment.

The information processing apparatus 100 according to the present embodiment is a device including a proximity/pressure detection device 104 capable of detecting proximity or contact of a device to a display device 105 and a pressure imposed by the display device 105 to the device. The information processing apparatus 100 changes, with regard to input means such as an on-screen keyboard provided with a plurality of input keys, a determination region used at the time of detecting an input to an input key, to reduce a physical load caused by successive key input operations. According to the present embodiment, the amount of movement of a finger is reduced by changing, based on an input key input within a predetermined period of time, the determination regions of other keys according to the moving distance of the finger.

Such an information processing apparatus 100 includes, as shown in FIG. 1, a CPU 101, a RAM (Random Access Memory) 102, a non-volatile memory 103, a proximity/pressure detection device 104, and a display device 105.

As described above, the CPU 101 functions as an arithmetic processing unit and a control unit, and controls entire operation within the information processing apparatus 100 according to various programs. Furthermore, the CPU 101 may be a microprocessor. The RAM 102 temporarily stores a program used in the execution of the CPU 101, or parameters or the like arbitrarily changed in the execution of the program. These are connected to each other by a host bus configured from a CPU bus or the like. The non-volatile memory 103 stores a program to be used by the CPU 101, operation parameters, or the like. A ROM (Read Only Memory), a flash memory, or the like, may be used as the non-volatile memory 103, for example.

The proximity/pressure detection device 104 is an example of an input device to which a user inputs information, and is configured from input means for inputting information, and an input control circuit or the like for generating an input signal based on an input by the user and outputting the same to the CPU 101. The proximity/pressure detection device 104 is layered over the display surface of the display device 105. The proximity/pressure detection device 104 according to the present embodiment can be configured from a proximity sensor capable of detecting proximity or contact to the display surface or a pressure sensor capable of detecting a pressure on the display surface.

The display device 105 is an example of an output device for outputting information. As the display device 105, a liquid crystal display (LCD) device, an organic light emitting diode (OLED) device, or the like, can be used, for example.

[Overview of Determination Region Enlargement Process for Key by Information Processing Apparatus]

Figure 2:
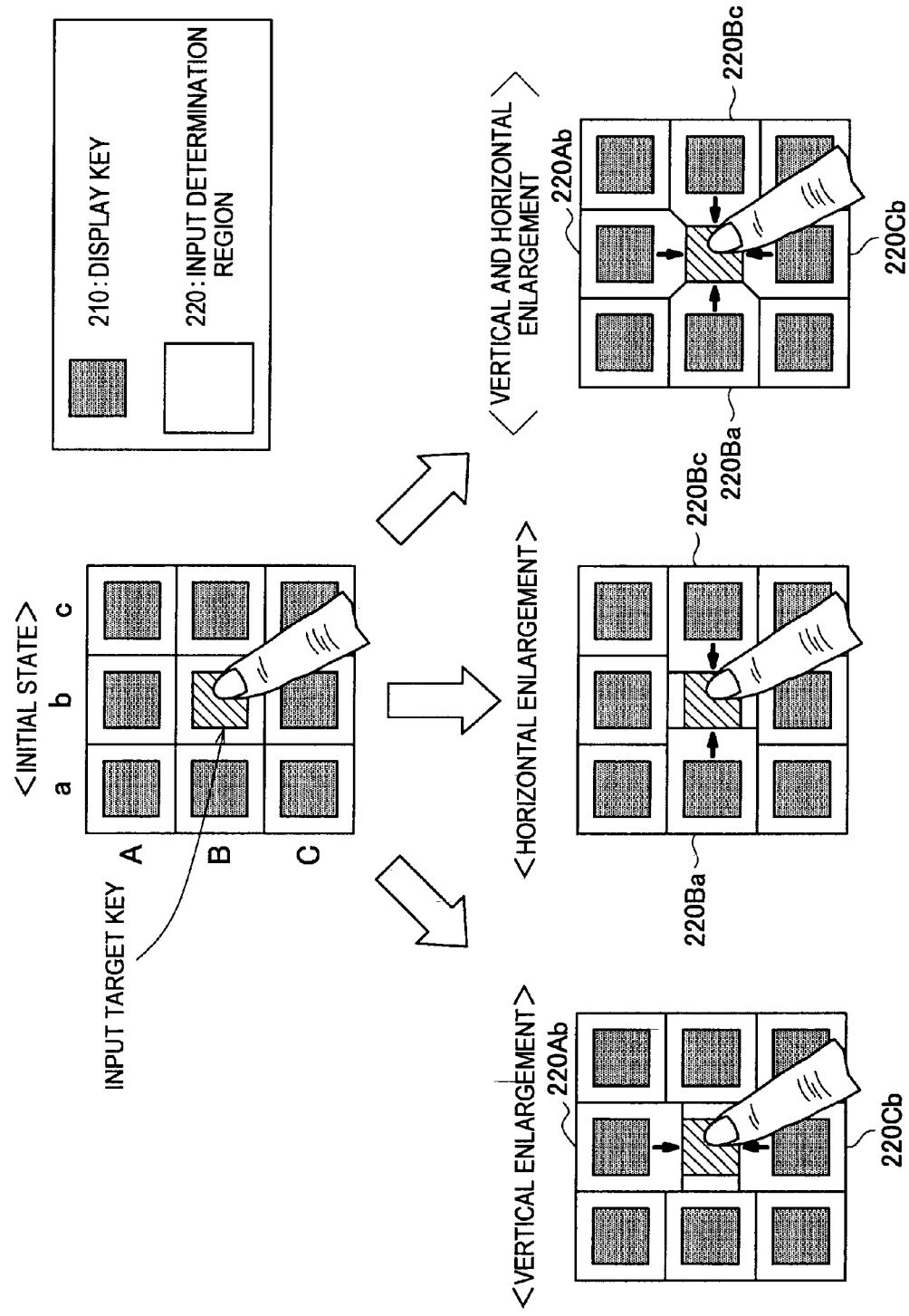
FIG. 2 is an explanatory diagram showing an overview of an enlargement process of determination regions of peripheral keys with respect to an input target key.
Figure 4:
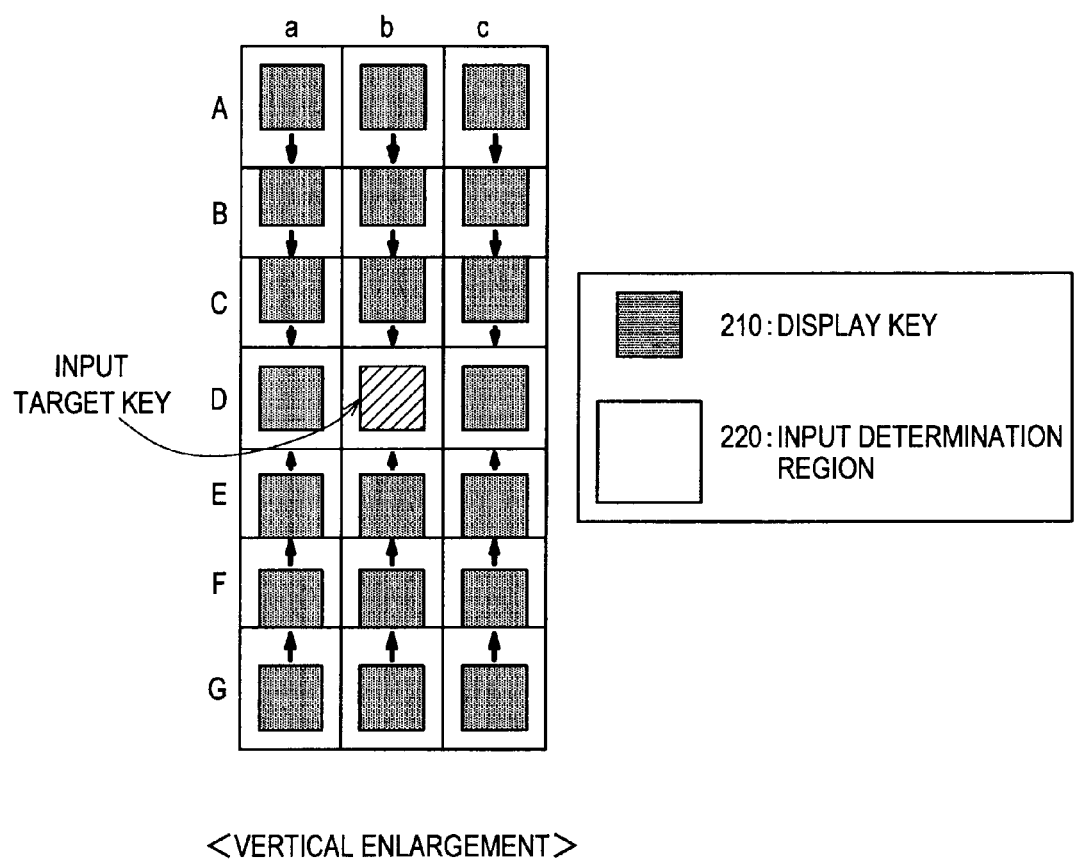
FIG. 4 is an explanatory diagram showing an overview of an enlargement process, in the vertical direction, of determination regions of keys positioned away from the input target key.

Next, with reference to FIGS. 2 to 4, an overview of a determination region enlargement process for a key performed by the information processing apparatus 100 according to the present embodiment will be given. Additionally, FIG. 2 is an explanatory diagram showing an overview of an enlargement process of determination regions of peripheral keys with respect to an input target key. FIG. 3 is an explanatory diagram showing an overview of an enlargement process, in the horizontal direction, of determination regions of keys positioned away from the input target key. FIG. 4 is an explanatory diagram showing an overview of an enlargement process, in the vertical direction, of determination regions of keys positioned away from the input target key.

As described above, according to the information processing apparatus 100 of the present embodiment, a determination region of an input key is changed, a physical load at the time of a user operating a next input key after the input target key has been inputted is reduced, and the operability is improved.

The following two may be conceived as the change in the determination region. One is for enlarging the determination regions of peripheral keys positioned around the input target key. Enlargement of the determination regions of the peripheral keys is performed, assuming that a key in the periphery of the input target key will be input next, to reduce the amount of movement of the finger operating the keys.

For example, it is assumed that, as shown in FIG. 2, a plurality of display keys 210 that are arranged three by three, for example, are displayed on the display device 105. At this time, a display key 210 positioned at row B, column b is taken as the input target key. When a finger is brought into proximity or in contact with this input target key, the information processing apparatus 100 enlarges determination regions 220 of peripheral keys around the input target key. As the method of enlarging the determination regions 220 of the peripheral keys, determination regions 220Ab and 220Cb of input keys positioned above and below the input target key may be enlarged towards the input target key, for example (vertical enlargement). Alternatively, determination regions 220Ba and 220Bc of input keys positioned on the left and right of the input target key may be enlarged towards the input target key, for example (horizontal enlargement). Alternatively, determination regions 220Ab, 220Cb, 220Ba and 220Bc of input keys positioned above and below and left and right of the input target key may be enlarged towards the input target key (vertical and horizontal enlargement).

By enlarging the determination regions of the peripheral keys of the input target key in this manner, the amount of movement of a finger at the time of selecting a peripheral key can be reduced. Additionally, in the case of successively pressing down the input target key, although the determination region of this key is made small, the deviation of the finger at the time of press-down is assumed to be small. Accordingly, it is assumed that no issue will arise even if the determination region is small. Also, even if the determination region is changed, the size of the display key 210 is not changed. This causes the layout of the display keys displayed on the display device 105 to not change, and, thus, a user can perform key operation without uneasiness.

Another change of the determination region is enlargement of determination regions of input keys positioned away from the input target key. Enlargement of the determination regions of input keys positioned away from the input target key is performed, assuming that a key positioned away from the input target key will be input next, to reduce the amount of movement of the finger operating the keys. For example, it is assumed that, as shown in FIG. 3, a plurality of display keys 210 that are arranged three by eleven, for example, are displayed on the display device 105. At this time, a display key 210 positioned at row B, column f is taken as the input target key. When a finger is brought into proximity or in contact with this input target key, the information processing apparatus 100 enlarges determination regions 220 of keys positioned away from the input target key.

As the method of enlarging the determination regions 220 of keys positioned away from the input target key, the determination regions 220 of input key positioned on the left and right of the input target key may be enlarged towards the input target key, as shown in FIG. 3 (horizontal enlargement). In this example, the determination regions 220 of columns a to c positioned on the left of the input target key and columns i to k positioned on the right of the input target key are enlarged. Furthermore, the rate of enlargement of a region may be higher for the determination region 220 of a key that is more separated from the input target key. In the example shown in FIG. 3, the determination regions 220 of columns a and k that are the farthest away from the input target key are changed so as to be larger than other determination regions 220. This can further reduce the load of operating a key with which the amount of movement of a finger from the input target key is large.

Alternatively, as shown in FIG. 4, the determination regions 220 of input keys positioned above and below the input target key may be enlarged towards the input target key, for example (vertical enlargement). In this example, a plurality of display keys 210 that are arranged seven by three, for example, are displayed on the display device 105, and the determination regions 220 of rows A to C positioned above the input target key and rows E to G positioned below the input target key are enlarged. Also in the example shown in FIG. 4, as with the example of FIG. 3, the rate of enlargement of a region may be higher for the determination region 220 of a key that is more separated from the input target key. In the example shown in FIG. 4, the determination regions 220 of rows A and G that are the farthest away from the input target key are changed so as to be larger than other determination regions 220. This can further reduce the load of operating a key with which the amount of movement of a finger from the input target key is large.

Additionally, the change of the determination region 220 may be performed by applying the overlap avoidance process for avoiding overlapping of keys of an on-screen keyboard disclosed in JP 2010-067135A, for example.

The information processing apparatus 100 changes the determination region based on the above two concepts, and reduces the physical load caused by successive key input operations by press-down. In the following, a functional configuration of the information processing apparatus 100 and a determination region change process performed by the information processing apparatus 100 will be described in detail. In the present embodiment, either of a proximity detection device and a pressure detection device may be used as the proximity/pressure detection device 104. Definitions of state relationships between a touch panel and a finger according to the type of the proximity/pressure detection device 104 are shown in FIG. 5.

As shown in FIG. 5, in the case of using a proximity detection device (for example, a proximity sensor), a region up to the position that is separate from the touch panel surface by a predetermined distance is defined as a proximity detection region where proximity can be detected by the device. A state where a finger is positioned outside the proximity detection region is defined as a non-contact state (state 0), a state where the finger is positioned within the proximity detection region is defined as a contact state (state 1), and a state where the finger is positioned within the proximity detection region and contact is detected by the touch panel is defined as a press-down state (state 2). On the other hand, in the case of using a pressure detection device (for example, a pressure sensor), a state where the finger is not in contact with the touch panel is defined as a non-contact state (state 0), and a state where the force of the finger pressing the touch panel does not exceed $F_{input}$ is defined as a contact state (state 1). Also, a state where the force of the finger pressing the touch panel exceeds $F_{input}$ is defined as a press-down state (state 2).

In the present embodiment, an explanation will be given on the information processing apparatus 100 that performs the process of changing the determination region of a key based on the state relationships between the touch panel and the finger.

[Functional Configuration of Information Processing Apparatus]

Figure 6:
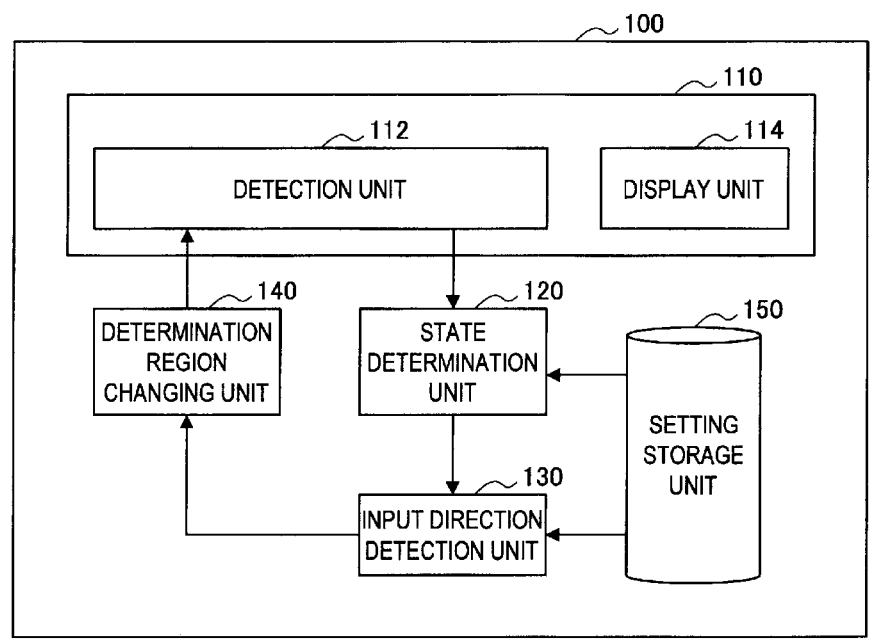
FIG. 6 is a block diagram showing a functional configuration of the information processing apparatus according to the embodiment.

First, a functional configuration of the information processing apparatus 100 according to the present embodiment will be described with reference to FIG. 6. Additionally, FIG. 6 is a block diagram showing a functional configuration of the information processing apparatus 100 according to the present embodiment. As shown in FIG. 6, the information processing apparatus 100 according to the present embodiment includes an input display unit 110, a state determination unit 120, an input direction detection unit 130, a determination region changing unit 140, and a setting storage unit 150.

The input display unit 110 includes a detection unit 112 for detecting the position of an operating tool such as a finger or a hand of a user, or the like, and receiving an input operation from the user, and, also, a display unit 114 for displaying information, and a touch panel or the like may be used therefor, for example. The detection unit 112 is a function unit for detecting an operation input for an object displayed on the display unit 114, and it corresponds to the proximity/pressure detection device 104 in FIG. 1. In the present embodiment, a proximity sensor capable of detecting proximity or contact to a touch panel, a pressure sensor capable of detecting pressure on the touch panel, or the like, can be used as the detection unit 112. The detection result of the detection unit 112 is output to the state determination unit 120.

On the other hand, the display unit 114 may use a liquid crystal display, an organic EL display, or the like, and is driven by a control unit (not shown) that performs a process of displaying information. The contents of display of the display unit 114 can also be changed according to the detection result of the detection unit 112. Additionally, in the determination region change process described later, display of display keys displayed on the display unit 114 is not changed, and the determination region for determining an operation input is changed. Accordingly, no visual change is caused due to the determination region change process. The information processing apparatus 100 functions, in a case an object group including a plurality of objects is displayed on the display unit 114, as with an on-screen keyboard, to reduce the operational load at the time of successively performing the input operation on displayed objects.

The state determination unit 120 determines a state relationship between the input display unit 110 which is the touch panel and a finger, based on the detection result of the detection unit 112. As described with reference to FIG. 5, the state determination unit 120 determines, based on the definition set according to the type of the detection unit 112, which of the non-contact state (state 0), the contact state (state 1) and the press-down state (state 2) the state of the finger with respect to the touch panel corresponds to. When the state of the finger with respect to the touch panel is determined, the state determination unit 120 outputs the determination result to the input direction detection unit 130.

The input direction detection unit 130 detects, based on the detection result of the detection unit 112, the movement direction (input direction) of the finger with respect to the display unit 114. The information processing apparatus 100 according to the present embodiment enlarges the determination region of an object in the movement direction (input direction) of the finger to facilitate operation of an object to be operated after the object which is the input target (input target key). For this reason, the input direction detection unit 130 detects the movement direction (input direction) of the finger, and outputs the same to the determination region changing unit 140. Additionally, details on the input direction detection process of the input direction detection unit 130 will be given later.

The determination region changing unit 140 changes the determination region of each object in the object group displayed on the display unit 114, based on the information input from the state determination unit 120 and the input direction detection unit 130. Although the details on the determination region change process will be described later, the determination region changing unit 140 changes, according to the state of operation input or the input direction of the finger, the determination regions of objects around or positioned away from the object which is the input target. This can facilitate the operation of an object to be operated after the object which is the input target. The determination region changing unit 140 changes determination region information indicating the determination region, and outputs the determination region information after change to the detection unit 112. The detection unit 112 will determine the presence/absence of operation input with respect to an object based on the determination region information after change.

The setting storage unit 150 is a storage unit for storing setting information that is necessary in the determination region change process. The setting information may be, for example, definition information specifying state relationships between a touch panel and a finger as shown in FIG. 5, contents of change of a determination region according to the input direction of a finger, or the like. The setting information stored in the setting storage unit 150 may be set in advance, or may be set by a user as appropriate. Furthermore, the information processing apparatus 100 may also include a memory (not shown) for temporarily storing the history of operation inputs by a finger.

[Determination Region Change Process by Information Processing Apparatus]

Figure 7:
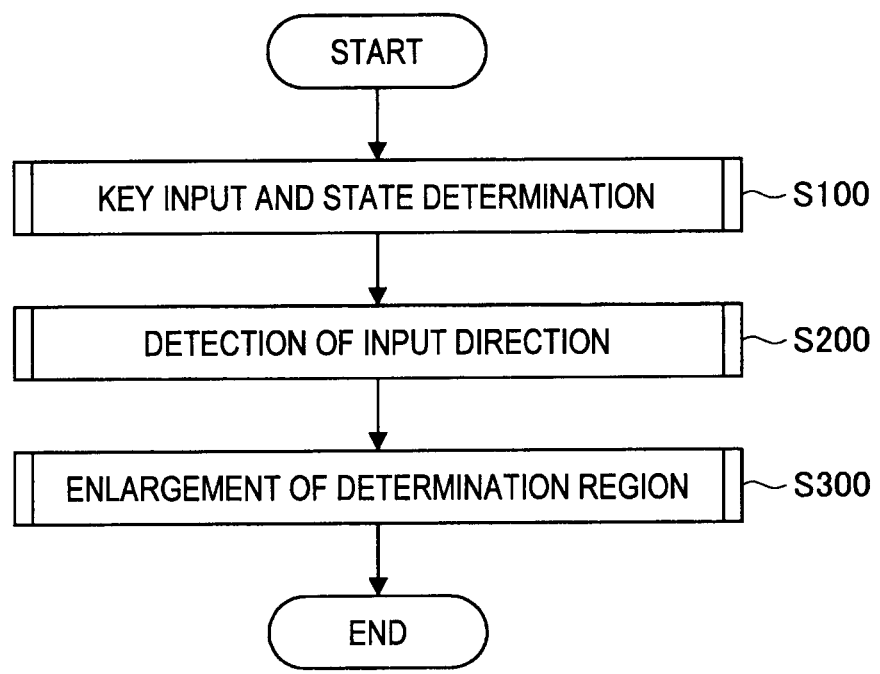
FIG. 7 is an overall flow chart showing a determination region change process by the information processing apparatus according to the embodiment.
Figure 8:
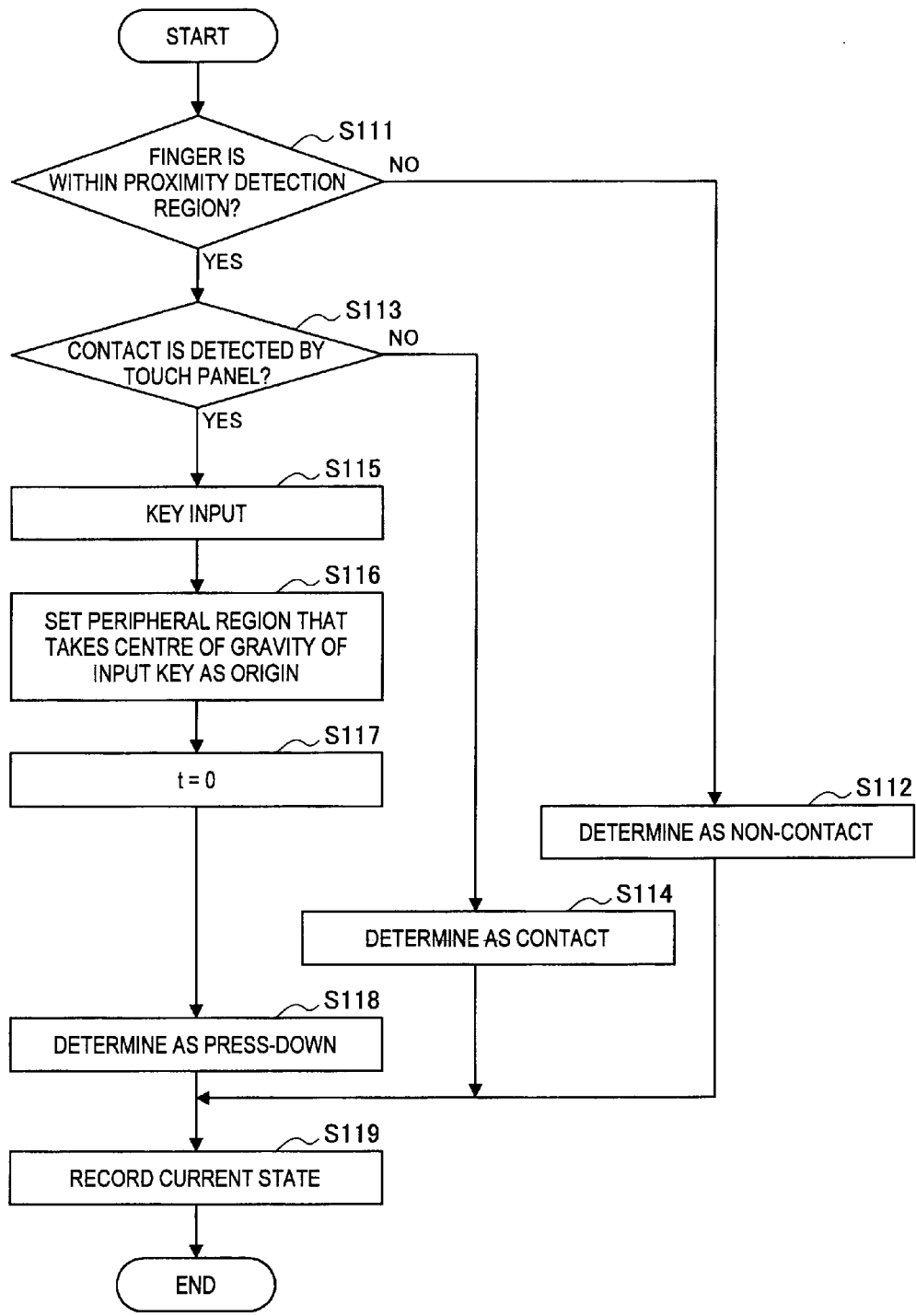
FIG. 8 is a flow chart showing processes of key input and state determination according to the embodiment by a proximity sensor.
Figure 9:
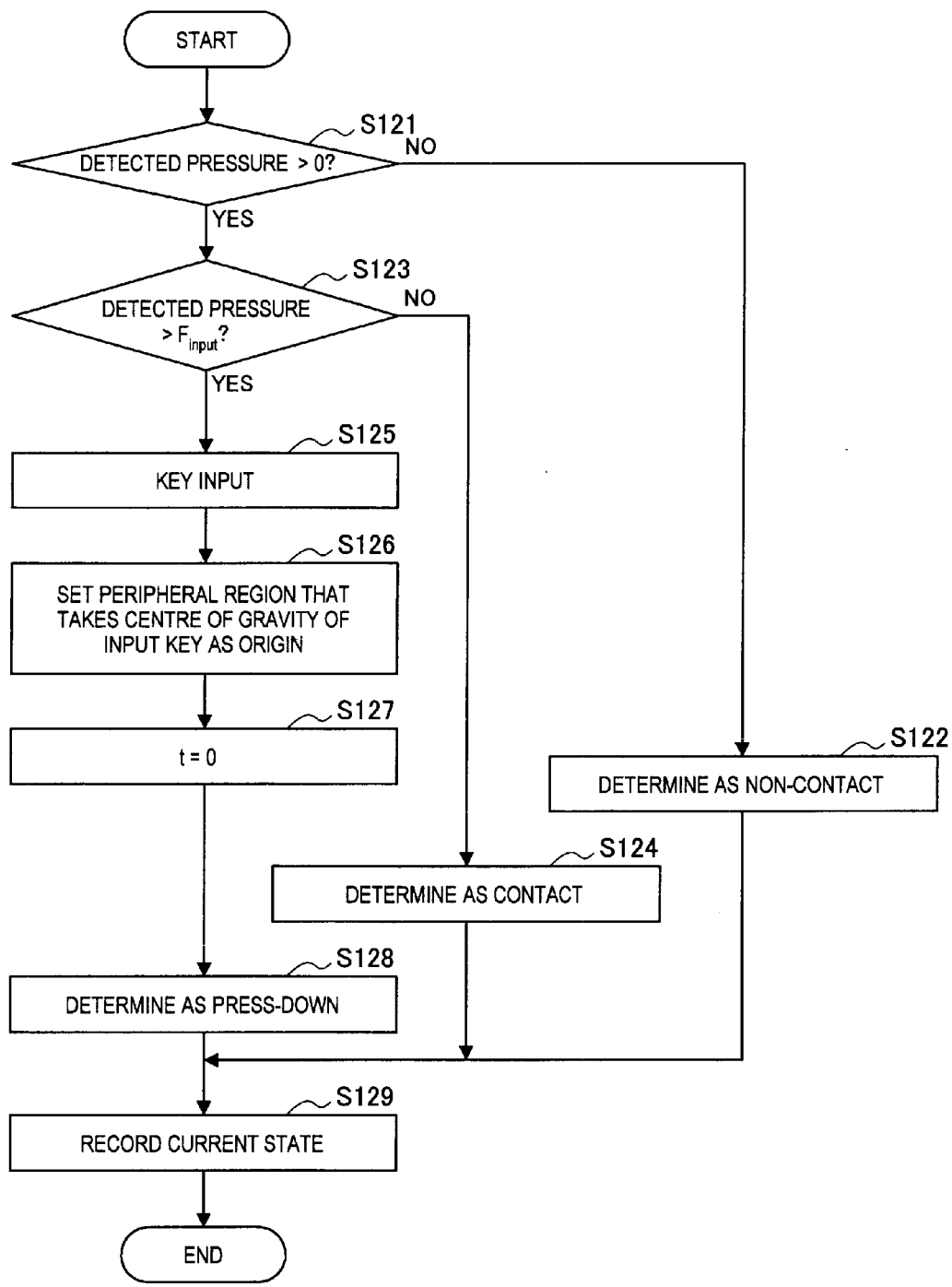
FIG. 9 is a flow chart showing processes of key input and state determination according to the embodiment by a pressure sensor.
Figure 11:
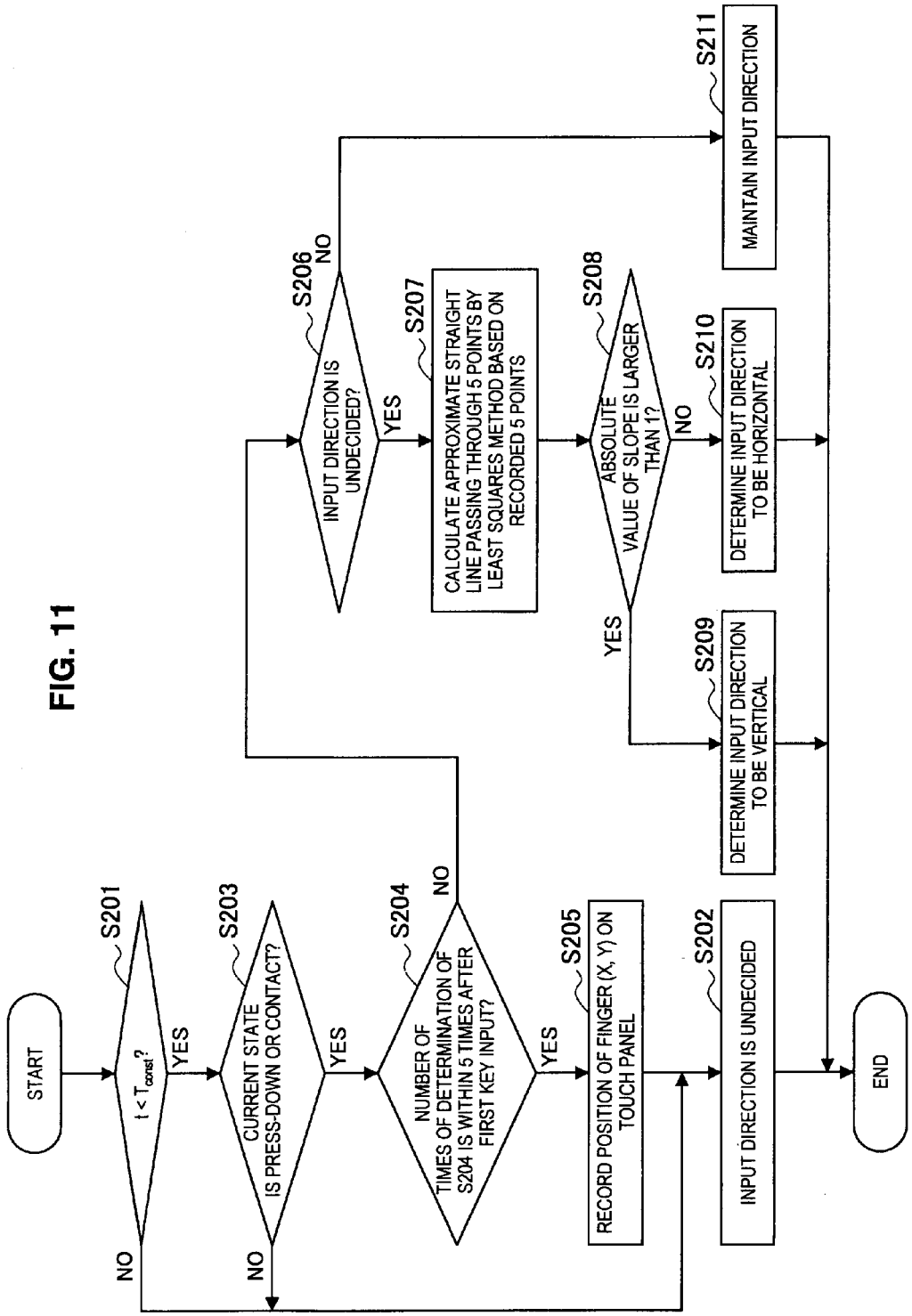
FIG. 11 is a flow chart showing the input direction detection process according to the embodiment.
Figure 13:
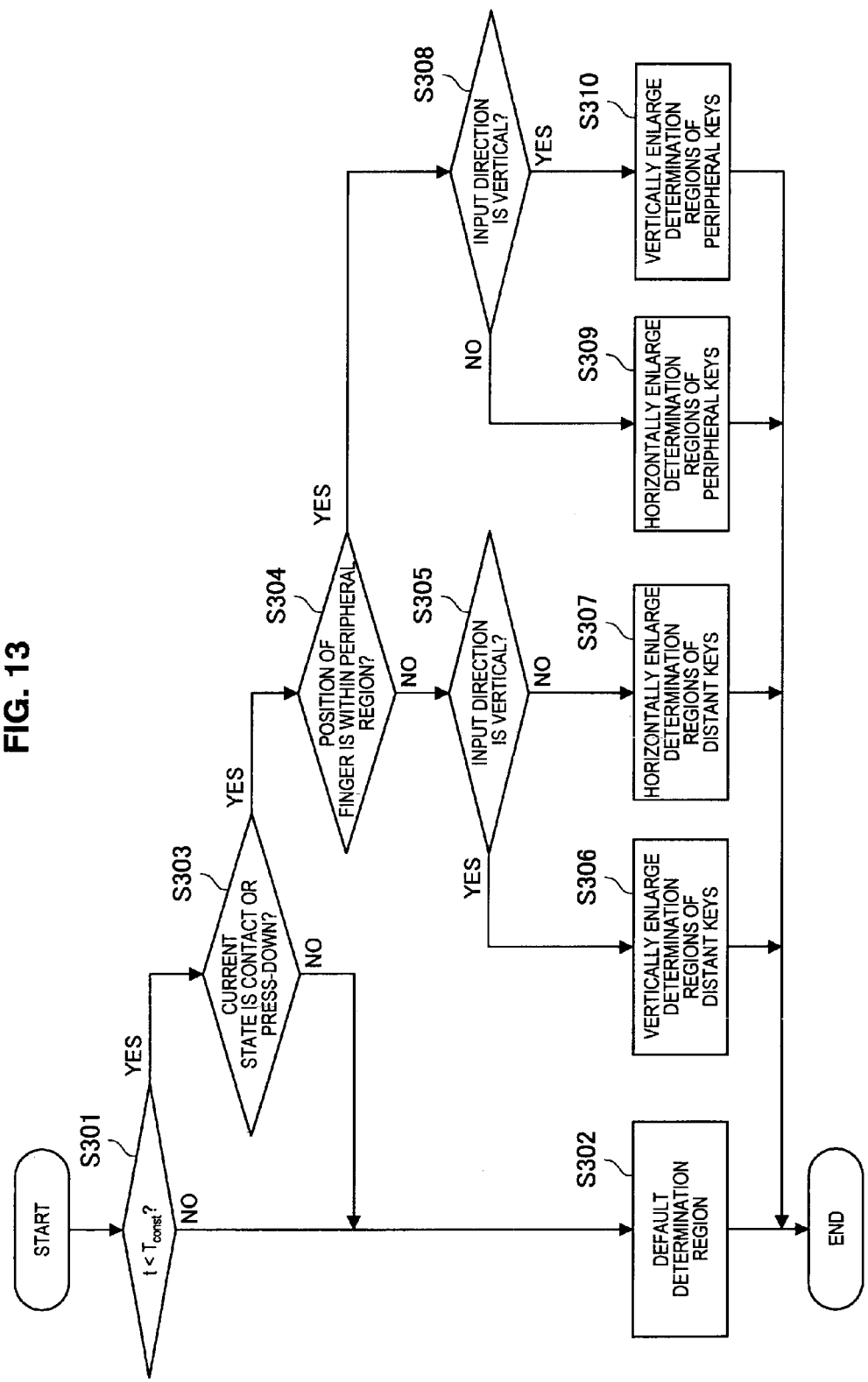
FIG. 13 is a flow chart showing a determination region selection process according to the embodiment.
Figure 14:
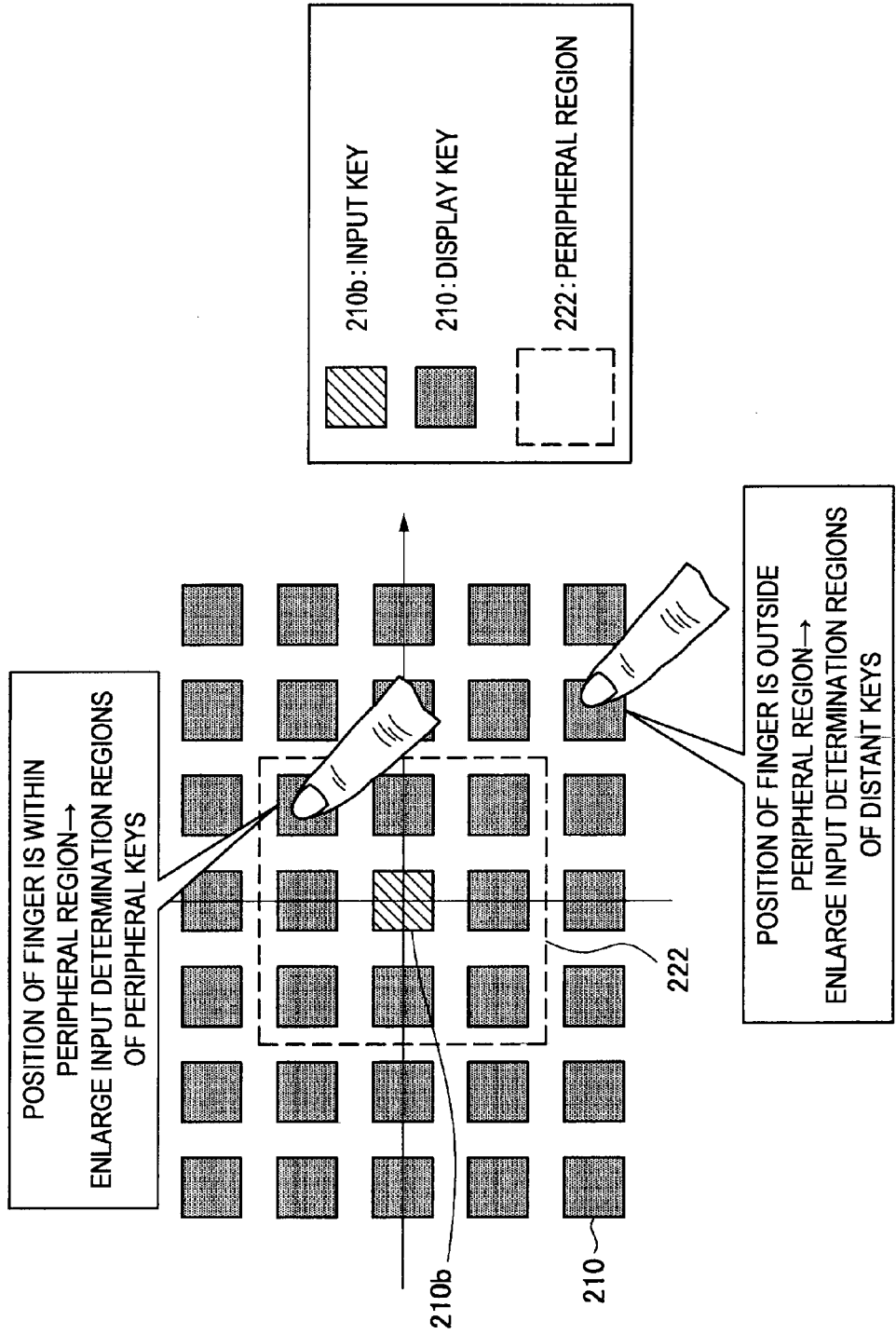
FIG. 14 is an explanatory diagram showing determination in the determination region selection process.

Next, the determination region change process for an object by the information processing apparatus 100 described above will be described with reference to FIGS. 7 to 14. Additionally, FIG. 7 is an overall flow chart showing the determination region change process by the information processing apparatus 100 according to the present embodiment. FIG. 8 is a flow chart showing processes of key input and state determination according to the present embodiment by a proximity sensor. FIG. 9 is a flow chart showing processes of key input and state determination according to the present embodiment by a pressure sensor. FIG. 10 is an explanatory diagram showing the input direction detection process according to the present embodiment. FIG. 11 is a flow chart showing the input direction detection process according to the present embodiment. FIG. 12 is an explanatory diagram showing a definition of a peripheral region in the case of specifying the peripheral region by a rectangle. FIG. 13 is a flow chart showing a determination region selection process according to the present embodiment. FIG. 14 is an explanatory diagram showing determination in the determination region selection process.

As shown in FIG. 7, with the determination region change process by the information processing apparatus 100 according to the present embodiment, first, detection of a key input performed by a user on the touch panel (input display unit 110) and determination of a state relationship between the touch panel and the finger are performed (S100). In step S100, processing described below will be performed according to the type of the proximity/pressure detection device 104.

(1-1-1. Processes of Key Input and State Determination: Proximity Sensor)

First, describing the processes of key input and state determination by a proximity sensor with reference to FIG. 8, first, the state determination unit 120 determines, based on the detection result of the detection unit 112, whether or not a finger is present within the proximity detection region (S111). The proximity detection region is a region up to a position that is separate from the touch panel surface by a predetermined distance, and the state determination unit 120 can determine whether or not a finger is present within the proximity detection region by an output value of the proximity sensor (a capacitance value, in the case of a sensor that outputs a capacitance value that changes according to the proximity distance). When it is determined that a finger is not present within the proximity detection region, the state determination unit 120 determines that a finger is not in contact with the touch panel (state 0) (S112), and records the current state in a memory (not shown) (S119).

On the other hand, when it is determined that a finger is present within the proximity detection region, the state determination unit 120 determines next whether or not contact detection that a finger is in contact with the touch panel is performed by the touch panel (S113). The contact detection can also be determined based on the output value of the proximity sensor that is the detection unit 112, as with the determination of whether or not a finger is present within the proximity detection region. In the case a finger is not in contact with the touch panel, that is, in the case a finger is present within the proximity detection region but not in contact with the touch panel, the state determination unit 120 determines this state as the contact state (state 1) (S114), records the current state in the memory (S119). Additionally, the finger is not actually in contact with the touch panel, but this state may be literally described as the "contact state."

On the other hand, when it is determined that a finger is in contact with the touch panel, the state determination unit 120 determines that there is a key input (S115). Then, a peripheral region that takes the centre of gravity of the input key as the origin is set (S116), and counting of time t is started (S117). The state determination unit 120 determines this state as the press-down state (state 2) (S118), and records the current state in the memory (S119).

(1-1-2. Processes of Key Input and State Determination: Pressure Sensor)

Next, describing processes of key input and state determination by a pressure sensor with reference to FIG. 9, first, the state determination unit 120 determines, based on the detection result of the detection unit 112, whether or not a detected pressure F of the pressure sensor exceeds 0 (S121). Additionally, the detection unit 112 outputs a value 0 when a finger is not in contact with the touch panel, and, when a finger is in contact with the touch panel, outputs a value according to the magnitude of the force of the finger pressing the touch panel. The force of the finger pressing the touch panel is larger as the output value of the detection unit 112 is larger. The state determination unit 120 thereby determines that, in the case the detected pressure F does not exceed 0, the finger is not in contact with the touch panel (state 0) (S122), and records the current state in a memory (S129).

On the other hand, in the case the detected pressure F exceeds 0, the state determination unit 120 next determines whether or not the detected pressure F of the pressure sensor exceeds a predetermined pressure threshold value $F_{input}$ (S123). In the case the detected pressure F of the finger pressing the touch panel does not exceed the predetermined pressure threshold value $F_{input}$, the state determination unit 120 determines this state as the contact state (state 1) (S124), and records the current state in the memory (S129).

On the other hand, in the case the detected pressure F of the finger pressing the touch panel exceeds the predetermined pressure threshold value $F_{input}$, the state determination unit 120 determines that there is a key input (S125). Then, a peripheral region that takes the centre of gravity of the input key as the origin is set (S126), and counting of time t is started (S127). The state determination unit 120 determines this state as the press-down state (state 2) (S128), and records the current state in the memory (S129).

In step S100 of FIG. 7, the state relationship between the finger and the touch panel is determined and a key input is detected by the process shown in FIG. 8 or 9 being performed according to the type of the proximity/pressure detection device 104.

(1-2. Input Direction Detection Process)

When the state relationship between the finger and the touch panel is determined and a key input is detected in step S100 of FIG. 7, the input direction detection unit 130 performs the process of detecting the input direction of the finger (S200). The input direction detection process for the finger is performed based on FIG. 11.

First, the input direction detection unit 130 determines whether or not the time t, counting of which has started after detection of the key input in FIG. 8 or 9, has exceeded a predetermined time $T_{const}$ (S201). The predetermined time $T_{const}$ is a time set to determine whether successive input operations are performed, and if an input operation is not performed within the predetermined time $T_{const}$, the determination region is changed to the determination region that is set as a default. As the default setting of the determination region, the determination regions of respective keys may be made the same, for example. In the case the time t exceeds the predetermined time $T_{const}$ in step S201, it is determined that input operations are not successively performed, and the determination region is changed to the default setting value. In this case, the input direction of the finger remains undecided (S202).

On the other hand, when the time t is less than the predetermined time $T_{const}$, the input direction detection unit 130 determines whether that the current state is either the press-down state (state 2) or the contact state (state 1) (S203). The current state can be acquired by the determination result of the state determination unit 120. When the current state is neither the press-down state (state 2) nor the contact state (state 1), that is, when it is the non-contact state (state 0), the input direction detection unit 130 changes the determination region to the default setting value, and the input direction of the finger is made to remain undecided (S202).

On the other hand, when the current state is determined in step S203 to be either the press-down state (state 2) or the contact state (state 1), the input direction detection unit 130 further determines whether or not the number of times the determination of the processing (S204) has been performed is within five times after the first key input (S204). Then, when the number of times the determination of step S204 has been performed is within five times, the input direction detection unit 130 records the position (x, y) of the finger on the touch panel acquired by the detection unit 112 in a memory (not shown) (S205), and the input direction of the finger is made to remain undecided (S202).

On the other hand, when the number of times the determination of step S204 has been performed is more than five times, the input direction detection unit 130 determines whether or not the input direction of the finger is undecided (S206). When the input direction is undecided, the input direction detection unit 130 decides the input direction by the processes of steps S207 to S210. On the other hand, in the case the input direction is already decided, the input direction detection unit 130 maintains the decided input direction (S211), and ends the process.

The input direction detection unit 130 calculates, with regard to the input direction, an approximate straight line based on a plurality of pieces of position information of the finger, which have been recorded in the memory in step S205 (for example, five pieces of position information of the finger), by using a least squares method, for example (S207). For example, in the case a finger-position record 230 is recorded as shown in FIG. 10, the input direction detection unit 130 linearly approximates the movement history of the finger and acquires the slope of the approximate straight line. Then, the input direction detection unit 130 determines whether the absolute value of the slope calculated in step S207 is larger than 1 (S208). That is, the slope of the approximate straight line indicates the movement direction (input direction) of the finger, and the input direction of the finger can be specified by determining the magnitude of the slope.

In the present embodiment, as shown in FIG. 10, the input direction detection unit 130 determines that the input direction of the finger is a vertical direction when the slope of the approximate straight line is greater than ±45 degrees, that is, when the absolute value of the slope is larger than 1 (S209). On the other hand, when the slope of the approximate straight line is within the range of ±45 degrees, that is, when the absolute value of the slope does not exceed 1, the input direction detection unit 130 determines that the input direction of the finger is a horizontal direction (S210). Additionally, in the present embodiment, the input direction of the finger is divided into a vertical direction and a horizontal direction taking the slope 1 of the approximate straight line based on the finger-position record 230 as the border, but the present disclosure is not limited to such an example. For example, the slope of the approximate straight line dividing the input direction of the finger may be set as appropriate according to the form of the device, especially the touch panel.

In which direction the key the finger will be operating lies with respect to the input key can be identified by the process of step S200.

(1-3. Determination Region Change Process)

When the input direction of the finger is detected by step S200 of FIG. 7, the determination region changing unit 140 performs the process of changing the determination region of a key according to the input direction of the finger (S300). The input direction detection process for the finger is performed based on FIG. 13.

First, the determination region changing unit 140 determines whether or not the time t, counting of which has started after detection of the key input in FIG. 8 or 9, has exceeded the predetermined time $T_{const}$ (S301). As described above, the predetermined time $T_{const}$ is a time set to determine whether successive input operations are performed, and if an input operation is not performed within the predetermined time $T_{const}$, the determination region is changed to the determination region that is set as a default. In the case the time t exceeds the predetermined time $T_{const}$ in step S301, it is determined that input operations are not successively performed, and the determination region is changed to the default setting value (S302).

On the other hand, when the time t is less than the predetermined time $T_{const}$, the determination region changing unit 140 determines whether that the current state is either the press-down state (state 2) or the contact state (state 1) (S303).

The current state can be acquired by the determination result of the state determination unit 120. When the current state is neither the press-down state (state 2) nor the contact state (state 1), that is, when it is the non-contact state (state 0), the determination region changing unit 140 changes the determination region to the default setting value (S302).

On the other hand, when the current state is determined in step S303 to be either the press-down state (state 2) or the contact state (state 1), the determination region changing unit 140 determines whether or not the position of the finger is within the peripheral region (S304). Whether or not the position of the finger is within the peripheral region can be determined by setting a peripheral region 222, as shown in FIG. 12, for example. In FIG. 12, a case is assumed where the shape of an input key 210*b* is a rectangle and keys are arranged in a matrix. At this time, a rectangular region specified with the input key 210*b* as the centre, the length in the vertical direction as h, and the length in the horizontal direction as w may be set as the peripheral region of the input key 210*b*, for example. The lengths h and w may be decided based on the size of the keys, and, for example, the peripheral region 222 may be set so as to include eight keys that are adjacent to the input key 210*b*, as shown in FIG. 14.

Returning to the explanation of FIG. 13, in the case it is determined in step S304 that the position of the finger is not within the peripheral region 222, the determination region changing unit 140 perceives that the finger is greatly removed from the input key 210*b*. Then, the determination region changing unit 140 determines whether or not the input direction detected by the input direction detection unit 130 is vertical (S305), and, in the case the input direction is the vertical direction, enlarges in the vertical direction the determination regions of the keys that are away from the input key 210*b* (S306). This is based on the assumption that, with the finger greatly moving in the vertical direction, a key that is positioned away in the vertical direction from the input key 210*b* will be operated next. By making larger the determination regions of the keys that are in the input direction of the finger, the distance that the finger moves until a key that is away from the input key 210*b* is selected can be reduced, and the physical load on the finger can be reduced.

On the other hand, in the case the input direction of the finger is determined in step S305 to be the horizontal direction, the determination region changing unit 140 enlarges in the horizontal direction the determination regions of the keys that are away from the input key 210*b* (S307). As with step S306, by making larger the determination regions of the keys that are in the horizontal direction, which is the movement direction of the finger, the distance that the finger moves until a key that is away from the input key 210*b* is selected can be reduced, and the physical load on the finger can be reduced.

Returning to the process of step S304, in the case the finger is determined to be present within the peripheral region 222, the determination region changing unit 140 perceives that the finger is not much moved from the position of the input key 210*b*. Then, the determination region changing unit 140 determines whether or not the input direction of the finger is the vertical direction (S308), and, in the case the input direction is the horizontal direction, enlarges in the horizontal direction the determination regions of the keys within the peripheral region 222 of the input key 210*b* (S309). This can facilitate selection of a key, around the input key 210*b*, that the finger is trying to operate, and the physical load on the finger can be reduced.

On the other hand, in the case the input direction is the vertical direction in step S308, the determination regions of the keys within the peripheral region 222 of the input key 210b are enlarged in the vertical direction (S310). This can facilitate, as with step S309, selection of a key, around the input key 210b, that the finger is trying to operate, and the physical load on the finger can be reduced. Additionally, in the case the same key as the input key 210b is to be successively operated, although the determination region of the input key 210b is made smaller than the default by the process of step S309 or S310, the deviation of the finger at the time of key press-down is small, and, thus, it is assumed that no issue will arise.

As described, the determination region of the key the user is trying to operate next is changed by the process of step S300 of FIG. 7 based on the input direction of the finger. This can reduce the moving distance of the finger at the time of successive key input operations. Additionally, the processes of steps S100 to S300 are performed when the relationship between the finger and the touch panel is the contact state (state 1) or the press-down state (state 2). Accordingly, in the case the relationship between the finger and the touch panel is in the non-contact state (state 0), it is determined that successive operation inputs are not performed, and the determination region changing unit 140 changes the determination region to the default setting value.

In the foregoing, the determination region change process by the information processing apparatus 100 according to the first embodiment of the present disclosure has been described. The information processing apparatus 100 according to the present embodiment determines the input direction of the finger and enlarges the determination region of the key that will be operated next, according to the state relationship between the finger and the touch panel, and thereby reduces the moving distance of the finger at the time of successive input operations. This can reduce the physical load caused due to friction between the finger and the device, and the operability of key input can be improved. Also, change by the information processing apparatus 100 is made on the determination region set for each key, and the layout of the keys is not visually changed. Accordingly, application to the current key input operation is also possible.

<2. Second Embodiment>

Next, a determination region change process by an information processing apparatus 100 according to the second embodiment of the present disclosure will be described with reference to FIGS. 15 to 19. The configuration of the information processing apparatus 100 according to the present embodiment is the same as the configuration of the information processing apparatus 100 according to the first embodiment shown in FIG. 6, but the definitions of the state relationships between the finger and the device are different from those of the first embodiment. The state relationship between the finger and the device is divided, in the first embodiment, into three states, namely, the non-contact state (state 0), the contact state (state 1), and the press-down state (state 2), but, in the present embodiment, it is divided into four states, namely, a non-contact state (state 0), a contact state (state 1), a semi-press-down state (state 2), and a press-down state (state 3). In the present embodiment, a pressure sensor will be used as the proximity/pressure detection device 104 of FIG. 1.

Figure 15:
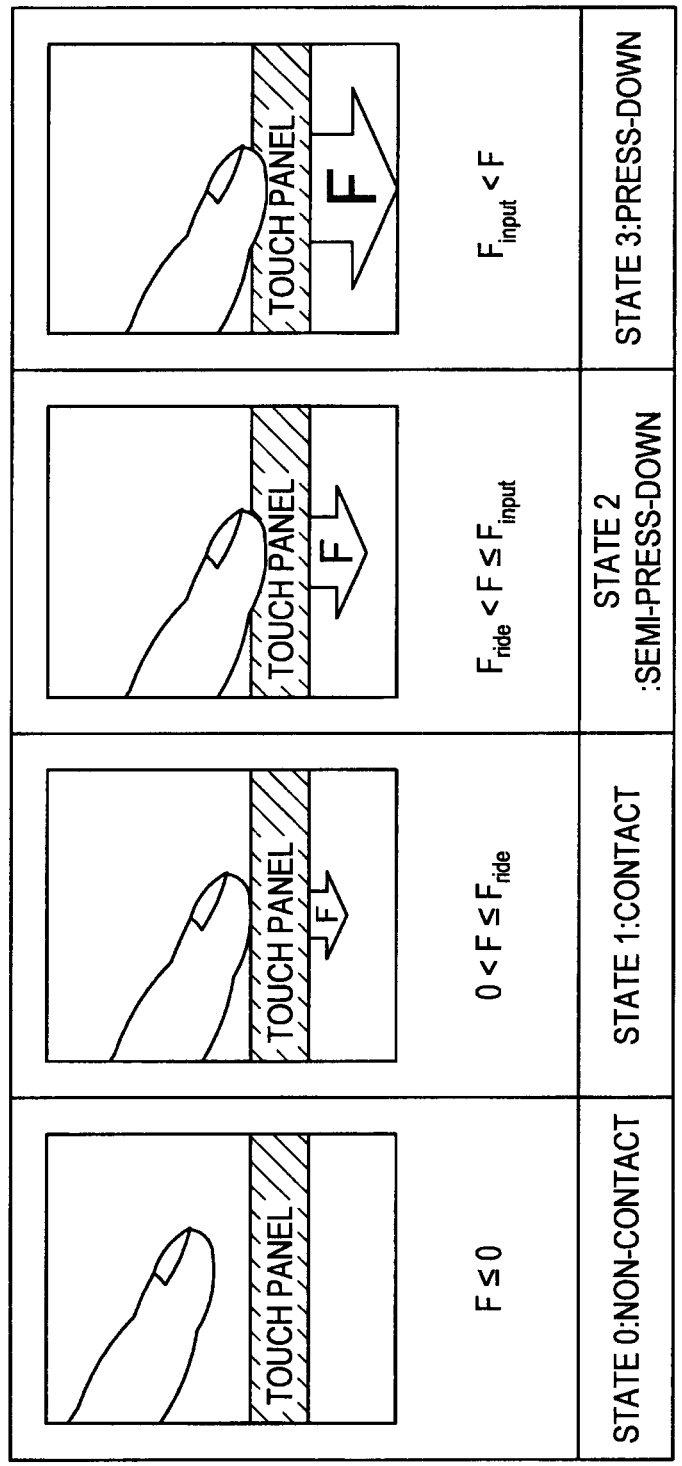
FIG. 15 is an explanatory diagram showing definitions of state relationships between a touch panel and a finger according to a second embodiment of the present disclosure.

In the present embodiment, the state relationship between the finger and the device is defined as shown in FIG. 15. That is, as shown in FIG. 15, a state where the finger is not in contact with the touch panel is defined as the non-contact state (state 0), and a state where the force of the finger pressing the touch panel is between 0 and a first pressure threshold value $F_{ride}$ is defined as the contact state (state 1). Also, a state where the force F of the finger pressing the touch panel exceeds the first pressure threshold value $F_{ride}$ but does not exceed a second pressure threshold value $F_{input}$ is defined as the semi-press-down state (state 2), and a state where the force F of the finger pressing the touch panel exceeds the second pressure threshold value $F_{input}$ is defined as the press-down state (state 3). Furthermore, the key present at the position of the finger in the press-down state is decided as the input key. In the following, the position of the centre of gravity of the input key may also be referred to as the key input position.

Figure 16:
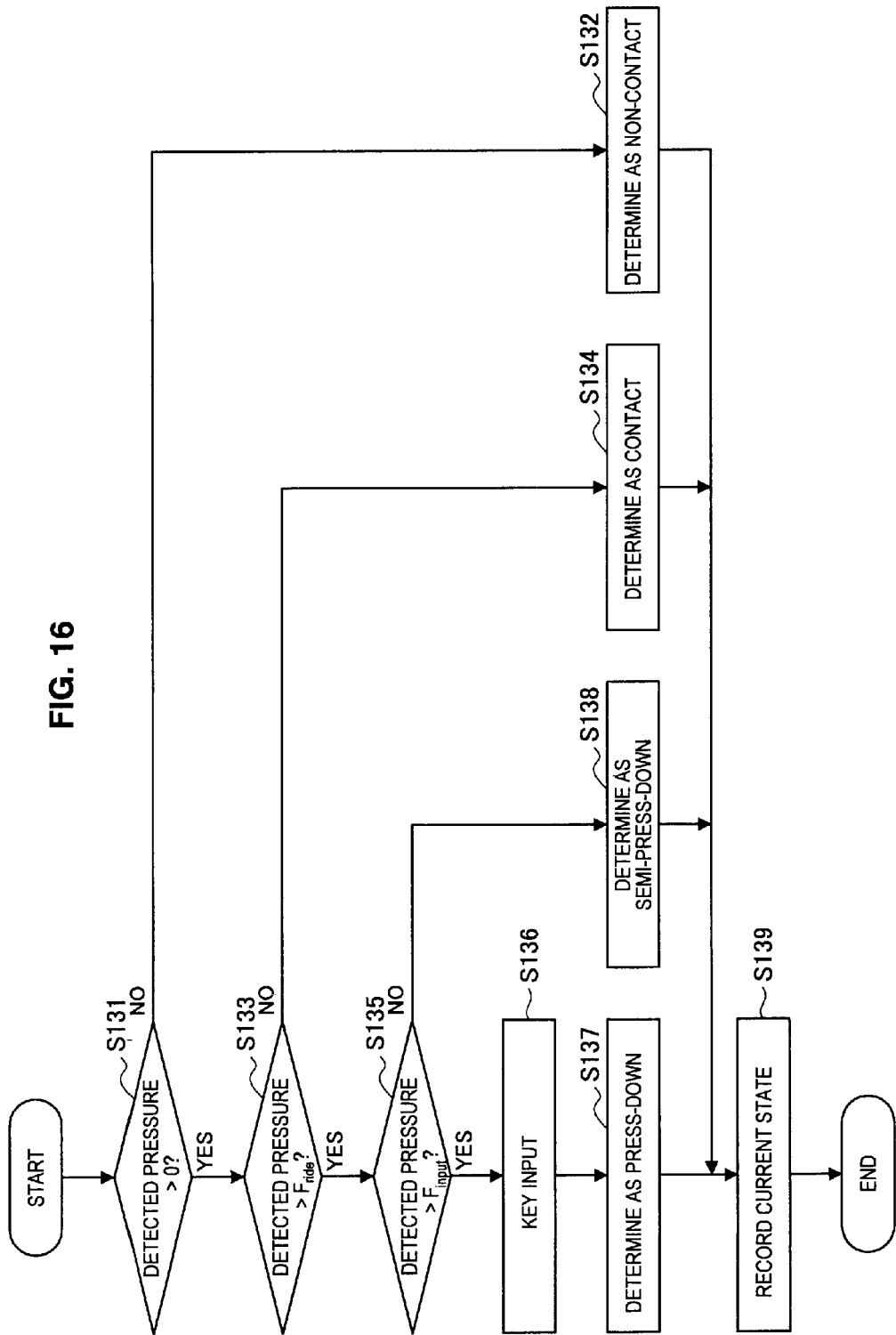
FIG. 16 is a flow chart showing processes of key input and state determination according to the embodiment.
Figure 17:
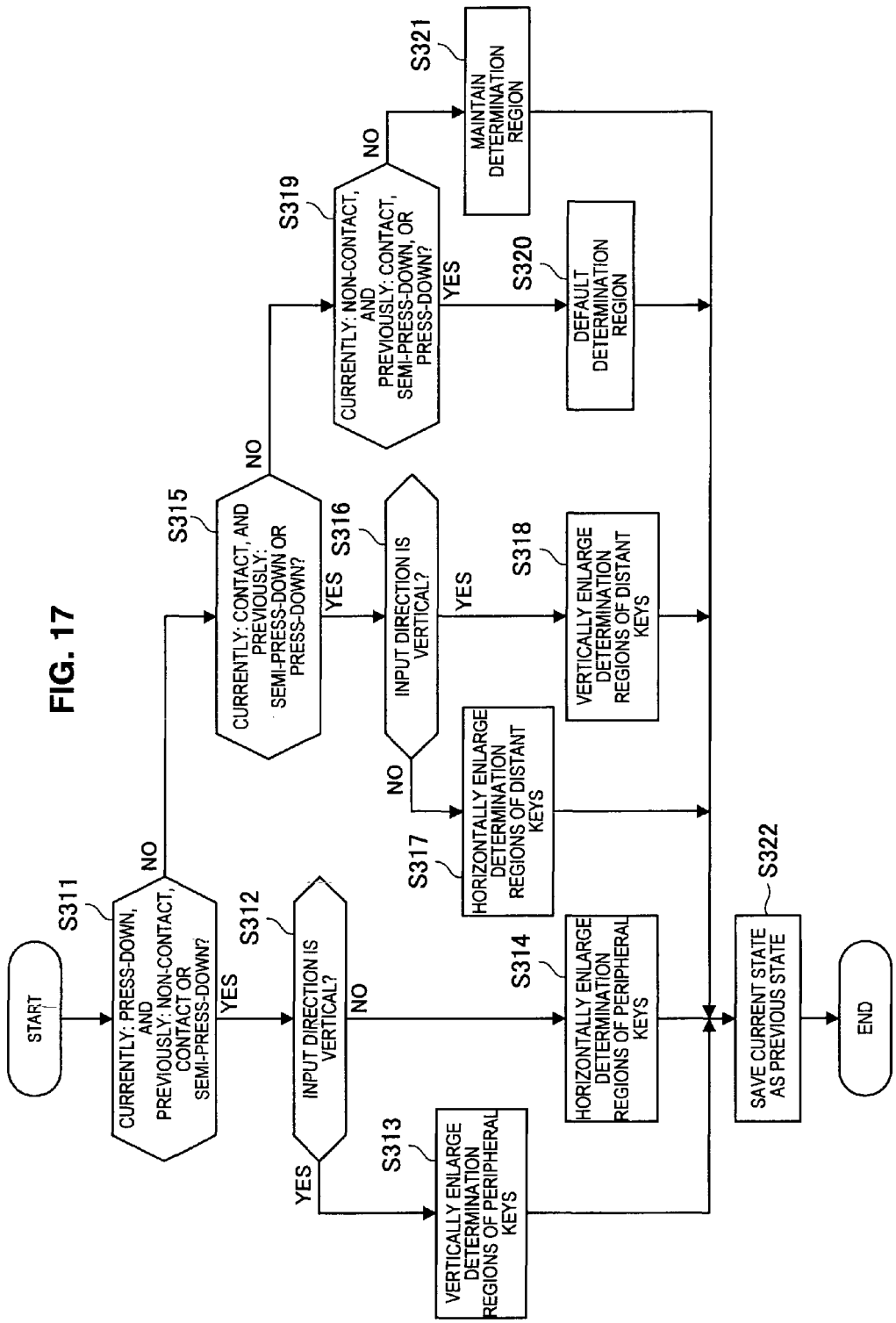
FIG. 17 is a flow chart showing a determination region selection process according to the embodiment.

Additionally, FIG. 16 is a flow chart showing processes of key input and state determination according to the present embodiment. FIG. 17 is a flow chart showing a determination region selection process according to the present embodiment. FIG. 18 is a list of processes summarizing the determination region selection process shown in FIG. 17. FIG. 19 is a graph showing an example of determination region change where the horizontal axis shows the total amount of movement of the finger and the vertical axis shows the magnitude of a detected pressure. Here, since the configuration of the information processing apparatus 100 according to the present embodiment is the same as that of the first embodiment, the detailed explanation thereof will be omitted and a determination region change process by the information processing apparatus 100 will be described. Also at this time, a detailed explanation of processes same as those of the first embodiment will be omitted.

[Determination Region Change Process by Information Processing Apparatus]

As with the first embodiment, the determination region change process by the information processing apparatus 100 according to the present embodiment is performed along the overall flow chart shown in FIG. 7. That is, as shown in FIG. 7, first, detection of a key input performed by a user on the touch panel (input display unit 110) and determination of a state relationship between the touch panel and the finger are performed (S100). In step S100, the process shown in FIG. 16 is performed.

(2-1. Processes of Key Input and State Determination)

As shown in FIG. 16, with the processes of key input and state determination, whether or not a detected pressure F of the pressure sensor exceeds 0 is first determined by the state determination unit 120 based on a detection result of the detection unit 112 (S131). Additionally, the detection unit 112 outputs a value 0 when the finger is not in contact with the touch panel, and, when the finger is in contact with the touch panel, outputs a value according to the magnitude of the force of the finger pressing the touch panel. The force of the finger pressing the touch panel is larger as the output value of the detection unit 112 is larger. The state determination unit 120 thereby determines that, in the case the detected pressure F does not exceed 0, the finger is not in contact with the touch panel (state 0) (S132), and records the current state in a memory (S139).

On the other hand, in the case the detected pressure F exceeds 0, the state determination unit 120 next determines whether or not the detected pressure F of the pressure sensor exceeds the first pressure threshold value $F_{ride}$ (S133). In the case the detected pressure F of the finger pressing the touch panel does not exceed the first pressure threshold value $F_{ride}$, the state determination unit 120 determines this state as the contact state (state 1) (S134), and records the current state in the memory (S139).

On the other hand, in the case the detected pressure F of the finger pressing the touch panel exceeds the first pressure threshold value $F_{ride}$, the state determination unit 120 further determines whether or not the detected pressure F of the pressure sensor exceeds the second pressure threshold value $F_{input}$ (S135). In the case the detected pressure F of the finger pressing the touch panel does not exceed the second pressure threshold value $F_{input}$, the state determination unit 120 determines this state as the semi-press-down state (state 2) (S138), and records the current state in the memory (S139).

On the other hand, in the case the detected pressure F of the finger pressing the touch panel exceeds the second pressure threshold value $F_{input}$, the state determination unit 120 determines that there is a key input (S136). Then, a peripheral region that takes the centre of gravity of the input key as the origin is set, and counting of time t is started. The state determination unit 120 determines this state as the press-down state (state 3) (S137), and records the current state in the memory (S139).

In step S100 of FIG. 7, the state relationship between the finger and the touch panel is determined and a key input is detected by the process shown in FIG. 16 being performed according to the type of the proximity/pressure detection device 104.

(2-2. Input Direction Detection Process)

When the state relationship between the finger and the touch panel is determined and a key input is detected in step S100 of FIG. 7, the input direction detection unit 130 performs the process of detecting the input direction of the finger (S200). As with the first embodiment, the input direction detection process for the finger is performed based on FIG. 11. Accordingly, an explanation on the input direction detection process will be omitted here. In which direction the key the finger will be operating lies with respect to the input key can be identified by the process of step S200.

(2-3. Determination Region Change Process)

When the input direction of the finger is detected by step S200 of FIG. 7, the determination region changing unit 140 performs the process of changing the determination region of a key according to the input direction of the finger (S300). The input direction detection process for the finger is performed based on FIG. 17.

In step S300, the determination region changing unit 140 checks the records of the state relationships between the finger and the touch panel determined according to FIG. 16, and compares the current state and the previous state. First, the determination region changing unit 140 determines whether or not the current state is the press-down state and the previous state is other than the press-down state (that is, any of the non-contact state, the contact state, and the semi-press-down state) (S311). In step S311, a state where the touch panel is strongly pressed down after the previous state is detected. In the case the determination condition of step S311 is satisfied, it is assumed that the finger is not greatly moved from the previous state, and, thus, the next input can be facilitated by enlarging the determination regions of the keys present in the peripheral region 222 of the input key 210b.

Thus, when the step S311 is satisfied, the determination region changing unit 140 determines whether the input direction of the finger is the vertical direction, to enlarge the determination regions of the keys in the peripheral region 222 of the input key 210b (S312). Then, in the case the input direction of the finger is the vertical direction, the determination region changing unit 140 enlarges, in the vertical direction, the determination regions of the keys positioned in the peripheral region 222 of the input 210b (S313). On the other hand, in the case the input direction of the finger is the horizontal direction, the determination region changing unit 140 enlarges, in the horizontal direction, the determination regions of the keys positioned in the peripheral region 222 of the input key 210b (S314). Additionally, the current state relationship between the finger and the touch panel in step S313 or S314 is recorded in a memory (not shown) as the previous state relationship (S322).

Additionally, the peripheral region 222 of the input key 210b is set in the same manner as in the first embodiment.

On the other hand, in the case the determination condition of step S311 is not satisfied, the determination region changing unit 140 next determines whether or not the current state is the contact state and the previous state is the semi-press-down state or the press-down state (S315). In step S315, a state where the force of pressing the touch panel is relaxed after the previous state is detected. In the case the determination condition of step S315 is satisfied, it is assumed that the possibility that a key positioned away from the input key 210b will be operated is high, and, thus, the determination region changing unit 140 performs the process of enlarging the determination regions of the keys that are positioned away from the input key 210b.

Thus, when step S315 is satisfied, the determination region changing unit 140 determines whether the input direction of the finger is the vertical direction, to enlarge the determination regions of the keys that are positioned away from the input key 210b (S316). Then, in the case the input direction of the finger is the horizontal direction, the determination region changing unit 140 enlarges, in the horizontal direction, the determination regions of the keys that are positioned away from the input key 210b (S317). On the other hand, in the case the input direction of the finger is the vertical direction, the determination region changing unit 140 enlarges, in the vertical direction, the determination regions of the keys that are positioned away from the input key 210b (S318). Additionally, the current state relationship between the finger and the touch panel in step S317 or S318 is recorded in a memory (not shown) as the previous state relationship (S322).

On the other hand, in the case the determination condition of step S315 is not satisfied, the determination region changing unit 140 further determines whether or not the current state is the non-contact state and the previous state is any of the contact state, the semi-press-down state and the press-down state (S319). Step S319 is a process of detecting that a transition to the non-contact state is made, and, in the case the determination condition of step S319 is satisfied, the determination region is changed to the default setting value.

That is, when step S319 is satisfied, the determination region changing unit 140 changes the determination region to the default setting value (S320). On the other hand, since the non-contact state of the finger with respect to the touch panel is continuing also in the case step S319 is not satisfied, the determination region changing unit 140 maintains the current determination region (S321). Then, the current state relationship between the finger and the touch panel in step S320 or S321 is recorded in a memory (not shown) as the previous state relationship (S322).

The determination region change process according to the present embodiment will be summarized as FIG. 18. In this manner, the determination region of the key the user will be operating next is changed by the process of step S300 of FIG. 7 based on the input direction of the finger. This can reduce the moving distance of the finger at the time of successive key input operations. Additionally, the processes of steps S100 to S300 are performed when the relationship between the finger and the touch panel is the contact state (state 1), the semi-press-down state (state 2), or the press-down state (state 3). Accordingly, in the case the relationship between the finger and the touch panel is the non-contact state (state 0), it is determined that successive operation inputs are not performed, and the determination region changing unit 140 changes the determination region to the default setting value.

[Example of Determination Region Change]

FIG. 19 shows an example of determination region change. In the graph shown in FIG. 19, the horizontal axis shows the total amount of movement of the finger and the vertical axis shows the magnitude of a detected pressure. The magnitude of the pressure is indicated by numbers from 0 to 10, and it is indicated that the larger the numerical value, the higher the pressure. Here, the first pressure threshold value $F_{ride}$ is set to 6.5, and the second pressure threshold value $F_{input}$ is set to 8.5.

As shown in FIG. 19, when the force of the finger pressing down the touch panel exceeds the second pressure threshold value, the key at the position of the finger is made the input key. While input is being successively performed after the position of this input key (input key position) is decided with a pressure by which the detected pressure is higher than the pressure threshold value $F_{ride}$, the determination regions of the keys positioned in the peripheral region of the input key stay in an enlarged state and the determination region of the input key stays in a reduced state. Then, when the detected pressure falls within the first pressure threshold value $F_{ride}$, the determination region changing unit 140 enlarges the determination regions of the keys that are positioned away from the input key. Then, when the finger is removed from the touch panel, the determination region is changed to the default setting value. The determination region changing unit 140 changes the determination region based on the state relationship between the finger and the touch panel in this manner, and improves the operability of key input.

In the foregoing, the determination region change process by the information processing apparatus 100 according to the second embodiment of the present disclosure has been described. As with the first embodiment, the information processing apparatus 100 according to the present embodiment reduces the moving distance of the finger at the time of successive input operations by determining the input direction of the finger and enlarging the determination region of the key that will be operated next according to the state relationship between the finger and the touch panel and the position of the finger. This can reduce the physical load caused due to friction between the finger and the device, and the operability of key input can be improved. Also, change by the information processing apparatus 100 is made on the determination region set for each key, and the layout of the keys is not visually changed. Accordingly, application to the current key input operation is also possible.

It should be understood by those skilled in the art that various modifications, combinations, sub-combinations and alterations may occur depending on design requirements and other factors insofar as they are within the scope of the appended claims or the equivalents thereof.

For example, in the above embodiments, the shape of the keys and the peripheral region 222 are made rectangular, but the present disclosure is not limited to such examples. For example, the shape of the keys may be circular. Also, the shape of the peripheral region 222 may be set according to the shape of the keys, and, when the shape of the keys is circular, for example, the shape of the peripheral region 222 may also be made circular.

What is claimed is:

1. An information processing apparatus comprising:
a display controller configured to control a display to display a keyboard;
an interface configured to receive position information corresponding to a user input detected at a user interface; and
a processor configured to determine that the received position information corresponds to a first determination region of a first key of the displayed keyboard, and expand a second determination region of a second key in a first direction toward the first determination region while reducing a size of the second determination region in a second direction opposite to the first direction based on the determining without changing a display size of the first or second key and without increasing a size of the first determination region.

2. The information processing apparatus of claim 1, wherein the information processing apparatus includes the display, and the display is the user interface.

3. The information processing apparatus of claim 1, wherein the user interface includes a proximity detection device configured to detect contact of an input member corresponding to the user input at the user interface.

4. The information processing apparatus of claim 1, wherein the user interface includes a proximity detection device configured to detect a proximity of an input member corresponding to the user input to the user interface that does not make contact with the user interface.

5. The information processing apparatus of claim 1, wherein the user interface includes a pressure sensor configured to detect a pressure of an input member corresponding to the user input at the user interface.

6. The information processing apparatus of claim 1, wherein the second key is located in a periphery of the first key, and the processor is configured to expand the second determination region in a direction toward the first determination region based on the determining.

7. The information processing apparatus of claim 1, wherein the second key is located more than one key away from the first key, and the processor is configured to expand the second determination region in a direction toward the first determination region based on the determining.

8. The information processing apparatus of claim 1, wherein the processor is configured to expand a plurality of determination regions corresponding to a plurality of keys, which include the second key and the second determination region, in a direction toward the first determination region based on the determining.

9. The information processing apparatus of claim 1, wherein the first determination region and the first key are configured in a first row including a first plurality of determination regions and a first plurality of keys, and the second determination region and the second key are configured in a second row including a second plurality of determination regions and a second plurality of keys.

10. The information processing apparatus of claim 9, wherein the second row is located in a periphery of the first row, and the processor is configured to expand the second plurality of determination regions in a direction toward the first row based on the determining.

11. The information processing apparatus of claim 9, wherein the second row is located more than one row away from the first row, and the processor is configured to expand the second plurality of determination regions in a direction toward the first row based on the determining.

12. The information processing apparatus of claim 1, wherein the interface is further configured to receive state information corresponding to the user input detected at the user interface, the state information indicating one of a non-contact state of an input member, a contact state of the input member, and a press-down state of the input member.

13. The information processing apparatus of claim 12, wherein the state information is output by a proximity detection device, and the proximity detection device configured to:

detect the non-contact state when the input member is positioned outside a proximity detection region of the proximity detection device;

detect the contact state when the input member is positioned within the proximity detection region of the proximity detection device but contact is not detected on the user interface; and detect the press-down state when the input member is positioned within the proximity detection region and contact is detected on the user interface.

14. The information processing apparatus of claim 12, wherein the state information is output by a pressure sensor, and the pressure sensor is configured to:

detect the non-contact state when the input member is not in contact with the user interface;

detect the contact state when the input member is in contact with the user interface, and a detected force of the contact is less than a predetermined threshold; and detect the press-down state when the input member is in contact with the user interface, and a detected force of the contact is greater than a predetermined threshold.

15. The information processing apparatus of claim 12, wherein the processor is configured to control expanding the second determination region based on the received state information corresponding to the user input detected at the user interface.

16. The information processing apparatus of claim 1, wherein the interface is further configured to receive direction information indicating a direction of an input member corresponding to the user input detected at the user interface.

17. The information processing apparatus of claim 16, wherein the processor is configured to control expanding the second determination region based on the received direction information indicating a direction of an input member corresponding to the user input detected at the user interface.

18. The information processing apparatus of claim 1, wherein the processor is configured to reduce the first determination region of the first key of the displayed keyboard upon expanding the second determination region of the second key.

19. A method performed by an information processing apparatus, the method comprising:

controlling, by a display controller, a display to display a keyboard;

receiving, at an interface of the information processing apparatus, position information corresponding to a user input detected at a user interface;

determining, by a processor of the information processing apparatus, that the received position information corresponds to a first determination region of a first key of the displayed keyboard; and expanding a second determination region of a second key in a first direction toward the first determination region while reducing a size of the second determination region in a second direction opposite to the first direction based on the determining without changing a display size of the first or second key and without increasing a size of the first determination region.

20. A non-transitory computer-readable medium including computer program instructions, which when executed by an information processing apparatus, cause the information processing apparatus to perform a method, the method comprising:

controlling a display to display a keyboard;

receiving position information corresponding to a user input detected at a user interface;

determining that the received position information corresponds to a first determination region of a first key of the displayed keyboard; and expand a second determination region of a second key in a first direction toward the first determination region while reducing a size of the second determination region in a second direction opposite to the first direction based on the determining without changing a display size of the first or second key and without increasing a size of the first determination region.

* * * * *